US011742985B2

(12) United States Patent
Berger et al.

(10) Patent No.: US 11,742,985 B2
(45) Date of Patent: Aug. 29, 2023

(54) TRANSMISSION PARAMETER SELECTION

(71) Applicant: QUALCOMM Incorporated, San Diego, CA (US)

(72) Inventors: Peer Berger, Hod Hasharon (IL); Shay Landis, Hod Hasharon (IL); Cheol Hee Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 17/217,758

(22) Filed: Mar. 30, 2021

(65) Prior Publication Data

US 2021/0385013 A1    Dec. 9, 2021

Related U.S. Application Data

(60) Provisional application No. 63/036,516, filed on Jun. 9, 2020.

(51) Int. Cl.
*H04L 1/00* (2006.01)
*H04W 4/40* (2018.01)

(52) U.S. Cl.
CPC .......... *H04L 1/0058* (2013.01); *H04L 1/0005* (2013.01); *H04L 1/0068* (2013.01); *H04W 4/40* (2018.02)

(58) Field of Classification Search
None
See application file for complete search history.

(56) References Cited

U.S. PATENT DOCUMENTS

2018/0343085 A1* 11/2018 Tirucherai Muralidharan ............
H04L 1/0013
2019/0349975 A1* 11/2019 Nammi ................. H04L 1/0031

FOREIGN PATENT DOCUMENTS

WO    WO-2019030236 A1    2/2019

OTHER PUBLICATIONS

3GPP TSG RAN WG1 Meeting #92bis Remaining Details of Demodulation Enhancements for LTE V2V, R1-1806483 (Year: 2018).*

(Continued)

*Primary Examiner* — Kouroush Mohebbi
(74) *Attorney, Agent, or Firm* — Danai Nelisile Mhembere; Holland & Hart LLP

(57) ABSTRACT

Methods, systems, and devices for wireless communications are described. A user equipment (UE) may identify combinations of modulation and coding schemes and resource block allocations that are associated with non-self-decodable codes. The UE may select a combination of a modulation and coding scheme and a resource block allocation based at least in part on the combinations of modulation and coding schemes and resource block allocations that are associated with non-self-decodable codes. The UE may transmit data over the physical channel in a communication generated using the selected combination of the modulation and coding scheme and the resource block allocation.

29 Claims, 14 Drawing Sheets

(56) References Cited

OTHER PUBLICATIONS

Ericsson: "PUSCH Enhancements for NR URLLC", 3GPP Draft, 3GPP TSG RAN WG1 Meeting #98bis, R1-1910547 PUSCH Enhancements for NR URLLC, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 8, 2019 (Oct. 8, 2019), XP051809151, 22 Pages, Retrieved from the Internet: URL: https://ftp.3gpp.org/tsg_ran/WG1_RL1/TSGR1_98b/Docs/R1-1910547.zip. R1-1910547 PUSCH Enhancements for NR URLLC. docx [retrieved on Oct. 8, 2019] Section 11; p. 12-p. 15 figures 14-15.

Huawei, et al., "Discussion on Solving the Code Rate Issue for Supporting 64QAM", 3GPP Draft, 3GPP TSG RAN WG1 Meeting #90bis, R1-1717003, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Sep. 29, 2017 (Sep. 29, 2017), XP051351509, 7 Pages, Retrieved from the Internet: URL: http://www.3gpp.org/ftp/tsg_ran/WG1_RL1/TSGR1_90b/Docs/. retrieved on Sep. 29, 2017] the whole document.

Intel Corporation: "Remaining Details of Demodulation Enhancements for LTE V2V Sidelink Communication", 3GPP Draft, 3GPP TSG RAN WG1 Meeting #92bis, R1-1806483, Intel—V2X 64QAM, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051441685, 5 Pages, Retrieved from the Internet: URL: http://www.3gpp.org/ftp/Meetings%5F3GPP%5FSYNC/RAN1/Docs/. [retrieved on May 20, 2018] Sections 2-3; p. 2-p. 4 figures 1, 2; table 1.

International Search Report and Written Opinion—PCT/US2021/025134—ISA/EPO—dated Jun. 29, 2021.

\* cited by examiner

TRANSMISSION PARAMETER SELECTION

CROSS REFERENCE

The present Application for Patent claims the benefit of U.S. Provisional Patent Application No. 63/036,516 by Berger et al., entitled "IMPROVED TRANSMISSION PARAMETER SELECTION," filed Jun. 9, 2020, assigned to the assignee hereof, and expressly incorporated by reference herein.

FIELD OF TECHNOLOGY

The following relates generally to wireless communications and more specifically to improved transmission parameter selection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may select transmission parameters for a set of data to be transmitted to another device. However, the selected transmission parameters may negatively impact the ability of the other device to decode the set of data, which may decrease system performance.

SUMMARY

The described techniques relate to improved methods, systems, devices, and apparatuses that support improved transmission parameter selection. A user equipment (UE) may identify a table or list that indicates the ability of a receiver to decode turbo codes associated with various combinations of modulation and coding schemes (MCSs) and resource block allocations. For example, the table or list may indicate combinations of MCSs and resource block allocations that are associated with self-decodable codes, combinations of MCSs and resource block allocations that are associated with non-self-decodable codes, and/or combinations of MCSs and resource block allocations that are associated with pseudo-non-self-decodable codes. The UE may use the table or list to select a combination of a modulation and coding scheme and a resource block allocation that is associated with a self-decodable code or, when conditions are appropriate, a pseudo-non-self-decodable code.

In some examples, the table(s) used by the UE are common to some or all of the devices in the wireless communications system. Such an implementation is possible because the ability of a receiving device to decode a code is a property of the encoder, as opposed to a property of the decoder. That is, the combinations of MCSs and resource block allocations associated with non-self-decodable codes are independent of the decoder used to decode the codes. Thus, multiple devices in a wireless communications system may be configured with the same table(s), regardless of the decoding capabilities of the devices.

A method of wireless communication is described. The method may include identifying, for a physical channel, a set of combinations of modulation and coding schemes and resource block allocations that are associated with non-self-decodable codes, selecting a combination of a modulation and coding scheme and a resource block allocation based on the set of combinations of modulation and coding schemes and resource block allocations that are associated with non-self-decodable codes, and transmitting data over the physical channel in a communication generated using the selected combination of the modulation and coding scheme and the resource block allocation.

An apparatus for wireless communication is described. The apparatus may include a processor, memory coupled with the processor, and instructions stored in the memory. The instructions may be executable by the processor to cause the apparatus to identify, for a physical channel, a set of combinations of modulation and coding schemes and resource block allocations that are associated with non-self-decodable codes, select a combination of a modulation and coding scheme and a resource block allocation based on the set of combinations of modulation and coding schemes and resource block allocations that are associated with non-self-decodable codes, and transmit data over the physical channel in a communication generated using the selected combination of the modulation and coding scheme and the resource block allocation.

Another apparatus for wireless communication is described. The apparatus may include means for identifying, for a physical channel, a set of combinations of modulation and coding schemes and resource block allocations that are associated with non-self-decodable codes, selecting a combination of a modulation and coding scheme and a resource block allocation based on the set of combinations of modulation and coding schemes and resource block allocations that are associated with non-self-decodable codes, and transmitting data over the physical channel in a communication generated using the selected combination of the modulation and coding scheme and the resource block allocation.

A non-transitory computer-readable medium storing code for wireless communication is described. The code may include instructions executable by a processor to identify, for a physical channel, a set of combinations of modulation and coding schemes and resource block allocations that are associated with non-self-decodable codes, select a combination of a modulation and coding scheme and a resource block allocation based on the set of combinations of modulation and coding schemes and resource block allocations that are associated with non-self-decodable codes, and transmit data over the physical channel in a communication generated using the selected combination of the modulation and coding scheme and the resource block allocation.

In some examples of the method, apparatuses, and non-transitory computer-readable medium described herein, the identifying further may include operations, features, means, or instructions for receiving control signaling that indicates that the set of combinations of modulation and coding schemes and resource block allocations may be associated with non-self-decodable codes.

Some examples of the method, apparatuses, and non-transitory computer-readable medium described herein may further include operations, features, means, or instructions for receiving control signaling that indicates a first table of a set of tables, where the first table includes the set of combinations of modulation and coding schemes and resource block allocations.

In some examples of the method, apparatuses, and non-transitory computer-readable medium described herein, the set of combinations of modulation and coding schemes and resource block allocations in the first table may be determined based on the physical channel, a number of redundancy versions, a predicted number of transmissions to be received by a wireless device, or a combination thereof.

Some examples of the method, apparatuses, and non-transitory computer-readable medium described herein may further include operations, features, means, or instructions for receiving control signaling that indicates the set of tables including the first table, where each table may be associated with a respective transmission configuration of a set of transmission configurations.

Some examples of the method, apparatuses, and non-transitory computer-readable medium described herein may further include operations, features, means, or instructions for receiving control signaling to indicate to apply a first transmission configuration of the set of transmission configurations, where the set of combinations of modulation and coding schemes and resource block allocations may be identified based on the first transmission configuration.

Some examples of the method, apparatuses, and non-transitory computer-readable medium described herein may further include operations, features, means, or instructions for transmitting, to a wireless device, an indication of the selected combination.

Some examples of the method, apparatuses, and non-transitory computer-readable medium described herein may further include operations, features, means, or instructions for receiving a transmission configuration that indicates one or more redundancy versions or a number of transmissions of the data, where the set of combinations may be identified based on the one or more redundancy versions or the number of transmissions.

Some examples of the method, apparatuses, and non-transitory computer-readable medium described herein may further include operations, features, means, or instructions for receiving a transmission configuration that indicates to transmit the data a single time, where the set of combinations may be identified based on the transmission configuration.

Some examples of the method, apparatuses, and non-transitory computer-readable medium described herein may further include operations, features, means, or instructions for receiving a transmission configuration that indicates to transmit the data multiple times, where the set of combinations may be identified based on the transmission configuration.

In some examples of the method, apparatuses, and non-transitory computer-readable medium described herein, the identifying further may include operations, features, means, or instructions for identifying the set of combinations based on a predicted number of transmissions of the data to be received by a wireless device.

Some examples of the method, apparatuses, and non-transitory computer-readable medium described herein may further include operations, features, means, or instructions for determining that a single transmission of the data will be received by a wireless device, where the set of combinations may be identified based on determining that the single transmission of the data will be received at the wireless device.

Some examples of the method, apparatuses, and non-transitory computer-readable medium described herein may further include operations, features, means, or instructions for determining that both the transmission of the data and the second transmission of the data will be received by a wireless device, where the set of combinations may be identified based on determining that both the transmission of the data and the second transmission of the data will be received by the wireless device.

Some examples of the method, apparatuses, and non-transitory computer-readable medium described herein may further include operations, features, means, or instructions for determining an initial combination of an initial modulation and coding scheme and an initial resource block allocation for the transmission of the data, and selecting the combination of the modulation and coding scheme and the resource block allocation based on the initial combination of the initial modulation and coding scheme and the initial resource block allocation being associated with a non-self-decodable code.

In some examples of the method, apparatuses, and non-transitory computer-readable medium described herein, the combination of the modulation and coding scheme and the resource block allocation includes a modulation and coding scheme that may be different than the initial modulation and coding scheme, a resource block allocation that may be different than the initial resource block allocation, or a combination thereof.

Some examples of the method, apparatuses, and non-transitory computer-readable medium described herein may further include operations, features, means, or instructions for determining a quantity of bits of the data, a busy ratio for the physical channel, a quality of the physical channel, or a combination thereof, where the initial combination may be determined based on the quantity of bits of the data, the busy ratio for the physical channel, the quality of the physical channel, or a combination thereof.

Some examples of the method, apparatuses, and non-transitory computer-readable medium described herein may further include operations, features, means, or instructions for identifying a second set of combinations of modulation and coding schemes and resource block allocations that may be associated with self-decodable codes or pseudo-non-self-decodable codes, where the combination of the modulation and coding scheme and the resource block allocation may be selected based on the second set of combinations.

Some examples of the method, apparatuses, and non-transitory computer-readable medium described herein may further include operations, features, means, or instructions for encoding the data using a turbo code that may be based on the combination of the modulation and coding scheme and the resource block allocation, and puncturing the encoded data, where transmitting the data includes transmitting the punctured encoded data.

In some examples of the method, apparatuses, and non-transitory computer-readable medium described herein, transmitting the data may include operations, features, means, or instructions for performing a cellular vehicle-to-everything (CV2X) transmission.

In some examples of the method, apparatuses, and non-transitory computer-readable medium described herein, the physical channel may be a physical sidelink shared channel (PSSCH).

A method of wireless communication is described. The method may include transmitting control signaling that indicates a set of combinations of modulation and coding scheme and resource block allocations that are associated with non-self-decodable codes, receiving, based on transmitting the control signaling, an indication of a selected combination of a modulation and coding scheme and a resource block allocation, and receiving, over a physical channel, data in a communication generated using the selected combination of the modulation and coding scheme and the resource block allocation.

An apparatus for wireless communication is described. The apparatus may include a processor, memory coupled with the processor, and instructions stored in the memory. The instructions may be executable by the processor to cause the apparatus to transmit control signaling that indicates a set of combinations of modulation and coding scheme and resource block allocations that are associated with non-self-decodable codes, receive, based on transmitting the control signaling, an indication of a selected combination of a modulation and coding scheme and a resource block allocation, and receive, over a physical channel, data in a communication generated using the selected combination of the modulation and coding scheme and the resource block allocation.

Another apparatus for wireless communication is described. The apparatus may include means for transmitting control signaling that indicates a set of combinations of modulation and coding scheme and resource block allocations that are associated with non-self-decodable codes, receiving, based on transmitting the control signaling, an indication of a selected combination of a modulation and coding scheme and a resource block allocation, and receiving, over a physical channel, data in a communication generated using the selected combination of the modulation and coding scheme and the resource block allocation.

A non-transitory computer-readable medium storing code for wireless communication is described. The code may include instructions executable by a processor to transmit control signaling that indicates a set of combinations of modulation and coding scheme and resource block allocations that are associated with non-self-decodable codes, receive, based on transmitting the control signaling, an indication of a selected combination of a modulation and coding scheme and a resource block allocation, and receive, over a physical channel, data in a communication generated using the selected combination of the modulation and coding scheme and the resource block allocation.

Some examples of the method, apparatuses, and non-transitory computer-readable medium described herein may further include operations, features, means, or instructions for transmitting control signaling that indicates that the set of combinations of modulation and coding schemes and resource block allocations may be associated with non-self-decodable codes.

Some examples of the method, apparatuses, and non-transitory computer-readable medium described herein may further include operations, features, means, or instructions for transmitting control signaling that indicates a first table of a set of tables, where the first table includes the set of combinations of modulation and coding schemes and resource block allocations.

In some examples of the method, apparatuses, and non-transitory computer-readable medium described herein, the set of combinations of modulation and coding schemes and resource block allocations in the first table may be determined based on the physical channel, a number of redundancy versions, a predicted number of transmissions to be received by a wireless device, or a combination thereof.

Some examples of the method, apparatuses, and non-transitory computer-readable medium described herein may further include operations, features, means, or instructions for transmitting control signaling that indicates a set of tables including the first table, where each table may be associated with a respective transmission configuration of a set of transmission configurations.

Some examples of the method, apparatuses, and non-transitory computer-readable medium described herein may further include operations, features, means, or instructions for transmitting control signaling to indicate to apply a first transmission configuration of the set of transmission configurations, where the set of combinations of modulation and coding schemes and resource block allocations may be identified based on the first transmission configuration.

Some examples of the method, apparatuses, and non-transitory computer-readable medium described herein may further include operations, features, means, or instructions for transmitting a transmission configuration that indicates one or more redundancy versions or a number of transmissions of the data, where the set of combinations may be identified based on the one or more redundancy versions or the number of transmissions.

Some examples of the method, apparatuses, and non-transitory computer-readable medium described herein may further include operations, features, means, or instructions for transmitting a transmission configuration that indicates to transmit the data a single time, where the set of combinations may be identified based on the transmission configuration.

Some examples of the method, apparatuses, and non-transitory computer-readable medium described herein may further include operations, features, means, or instructions for transmitting a transmission configuration that indicates to transmit the data multiple times, where the set of combinations may be identified based on the transmission configuration.

In some examples of the method, apparatuses, and non-transitory computer-readable medium described herein, the control signaling indicates a second set of combinations of modulation and coding schemes and resource block allocations that may be associated with self-decodable codes, a third set of combinations of modulation and coding schemes and resource block allocations that may be associated with pseudo-non-self-decodable codes, or a combination thereof.

In some examples of the method, apparatuses, and non-transitory computer-readable medium described herein, receiving the data may include operations, features, means, or instructions for receiving the data in a CV2X transmission.

In some examples of the method, apparatuses, and non-transitory computer-readable medium described herein, the physical channel may be a PSSCH.

DETAILED DESCRIPTION

Figure 1:
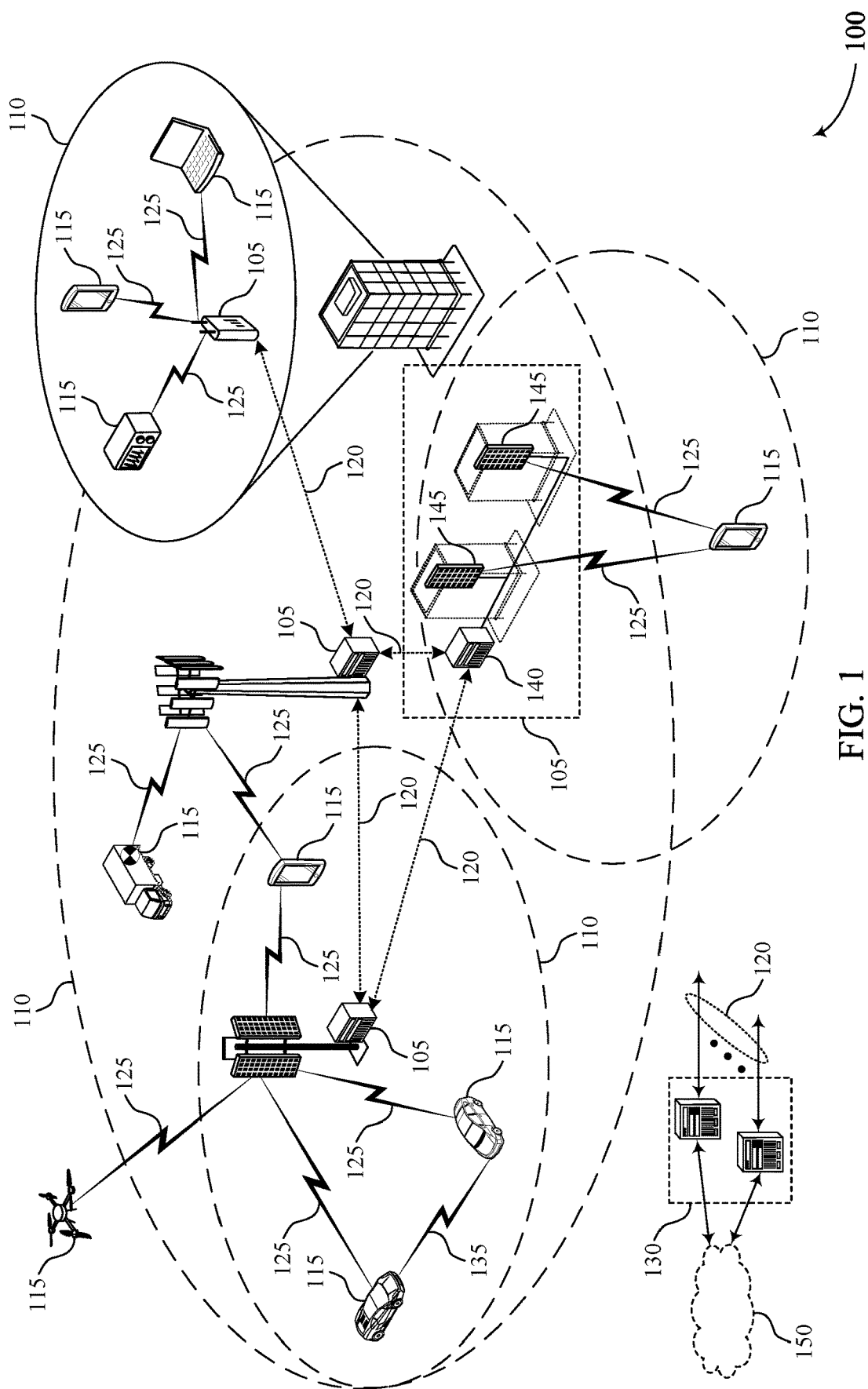
FIG. 1 illustrates an example of a system for wireless communications in accordance with aspects of the present disclosure.

In some wireless communications systems, a wireless device may encode data with an error correction code before transmitting the data to another wireless device. For example a wireless device may apply a turbo code to a set of data to increase the reliability of the data transfer. The turbo code applied to a set of data may be a function of various transmission parameters used for the set of data, such as the modulation and coding scheme (MCS) applied to the set of data and the quantity of resource blocks allocated for the set of data. But in some cases, the selected MCS and quantity of resource blocks may result in a turbo code that is non-self-decodable after additional processing (e.g., puncturing) at the transmitter. A non-self-decodable code may be a code that cannot be decoded by a receiving device even if the code is transmitted multiple times and the channel conditions are ideal. A transmitting wireless device may consume excess power and processing resources by transmitting data encoded with a code that is non-self-decodable ("non-self-decodable data"), a receiving wireless device may consume excess power and processing resources by attempting to decode the non-self-decodable data, and the transmission of the non-self-decodable data may consume channel resources, decreasing system throughput.

According to the techniques described herein, a wireless device may avoid transmitting non-self-decodable data by referencing one or more blacklists before selecting the MCS and quantity of resource blocks for the data. A blacklist may be a table or list that indicates combinations of MCSs and resource block quantities that result in non-self-decodable turbo codes, or turbo codes that are non-self-decodable in certain conditions ("pseudo-non-self-decodable").

As an example, after selecting an initial combination of an MCS and a quantity of resource blocks for a data transmission, a wireless device may reference the blacklist(s) to determine whether the selected combination of the MCS and the quantity of resource blocks is associated with a non-self-decodable code. If the combination is not associated with a non-self-decodable code, the wireless device may perform the data transmission using the selected combination of the MCS and the quantity of resource blocks. But if the combination is associated with a non-self-decodable code, the wireless device may select a new MCS and/or quantity of resource blocks for the data transmission so that the resulting combination is associated with a self-decodable code. Thus, a wireless device may increase system throughput by avoiding problematic combinations of transmission parameters, such as combinations of MCS and resource block quantities that result in non-self-decodable turbo codes.

Aspects of the disclosure are initially described in the context of wireless communications systems. Specific examples of a wireless communications subsystem, a wireless communications device, and a process flow that support improved transmission parameter selection are then described. Aspects of the disclosure are further illustrated by and described with reference to apparatus diagrams, system diagrams, and flowcharts that relate to improved transmission parameter selection.

FIG. 1 illustrates an example of a wireless communications system 100 that supports improved transmission parameter selection in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving coverage area 110. In some examples, different coverage areas 110 associated with different technologies may overlap, but the different coverage areas 110 may be supported by the same base station 105. In other examples, the overlapping coverage areas 110 associated with different technologies may be supported by different base stations 105. The wireless communications system 100 may include, for example, a heterogeneous network in which different types of the base stations 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the coverage area 110 of a base station 105. Other UEs 115 in such a group may be outside the coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, cellular V2X (CV2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, the devices in the wireless communications system 100 may implement a variety of techniques to increase the reliability of communications. For example, the devices may implement error correction encoding and HARQ processes to increase the reliability of a data transmission. Error correction encoding may involve a wireless device generating a code (e.g., an error correction code, such as a turbo code) that, when applied to a set of data, transforms the set of data into a codeword (e.g., encoded data) that can be used to detect errors in the data. After a set of data is encoded, the encoded set of data (e.g., codeword) may undergo additional processing to prepare the encoded data for transmission. For example, the encoded data may undergo a rate matching process to trim the data rate to an appropriate level. A rate matching process may involve a puncturing operation in which certain bits of encoded data are discarded to reduce the data rate.

A HARQ process may involve a device transmitting multiple versions of the same data in different repetitions (referred to as redundancy versions (RV)) so that a receiving device has a higher probability of receiving and decoding the data. For example, a device may transmit two or more versions of the same data so that a receiving device can combine the information from multiple transmissions (and therefore successfully decode the data even if one or more of the transmissions is degraded during propagation). A transmitting device may transmit multiple versions of the same data automatically or in response to HARQ feedback (e.g., a negative acknowledgement (NACK)) from the receiving device indicating that the first version was not successfully decoded. In some examples, a transmission configuration may indicate the number of times a device is to transmit a set of data and/or one or more redundancy versions associated with the set of data.

Prior to transmitting a set of data, a device may select an MCS to be applied to the set of data and quantity of resource blocks over which to transmit the set of data. A resource block may refer to a set of contiguous time and frequency resources (e.g., the resources in a slot that spans twelve subcarriers), and a quantity of resource blocks selected for a transmission may be referred to a resource block allocation, resource allocation, or other suitable terminology. Because the transport block size (e.g., the quantity of bits that can be conveyed in a transmission) is a function of the MCS and the resource block allocation, a device may select the MCS and resource block allocation based on the quantity of bits in the set of data to be transmitted, among other factors. For example, the device may select an MCS and a resource block allocation that results in a transport block size that is adequate (e.g., large enough) to convey the quantity of bits in the set of data.

But in some cases, the MCS and the resource block allocation selected for transmission of a set of data may negatively affect the ability of a receiving device to decode the data transmission. As noted, the error correction code (e.g., a turbo code) used to encode the data may be generated based on the MCS and resource block allocation for the data. But the puncturing process employed by the device may only be suitable for certain codes, meaning that data encoded with some codes is rendered non-self-decodable after the puncturing process. In some examples, code puncturing may cause degradations (e.g., very large degradations) and may even cause a code to be non-self-decodable. In some examples, puncturing may be performed on a per-symbol basis. Additionally or alternatively, as noted above, puncturing may be used by a rate matching process to achieve an appropriate rate if the base code rate (e.g., ⅓) is higher than desired.

A code or data transmission is considered self-decodable if a receiving device is able to decode data encoded with the code (e.g., with or without combining multiple transmissions of the data). Conversely, a code or data transmission is considered non-self-decodable if a receiving device is unable to decode data encoded with the code even if the code is transmitted multiple times and the channel conditions are ideal (e.g., infinite signal to noise ratio). Thus, a self-decodable code is one that, when used to encode data, can be decoded by a receiving device based on one or more transmissions of the encoded data; whereas a non-self-decodable code is one that, when used to encode data, cannot be decoded by a receiving device regardless of the quantity of transmissions of the encoded data. As described herein, the classification of a code as self-decodable or non-self-decodable may refer to the ability of a receiving device to decode data encoded with the code after post-encoding processing, such as puncturing. So, a code that is initially self-decodable but rendered non-self-decodable after puncturing may be referred to as a non-self-decodable code. Transmitting data that is non-self-decodable may decrease system throughput and increase the consumption of processing resources and power at both devices involved in the communication.

According to the techniques described herein, a plurality of combinations of modulation and coding schemes and resource block allocations that are associated with non-self-decodable codes for a physical channel can be identified. For examples, a device may maintain one or more tables or lists of combinations of transmission parameters (e.g., MCSs and resource block allocations) that are associated with (e.g., result in, yield, generate) codes (e.g., turbo codes) that are non-self-decodable. After selecting an initial combination of an MCS and a resource block allocation for a set of data (e.g., for a broadcast transmission), the device may identify the table(s) to determine whether the combination is associated with a non-self-decodable code (e.g., in response to control signaling as outlined below). If the initial combination is associated with a non-self-decodable code, the device may select a new combination of MCS and resource block allocation that is not associated with a non-self-decodable code. If the initial combination is not associated with associated with a non-self-decodable code, the device may keep the initial combination. After finalizing the combination of the MCS and the resource block allocation based on the table(s), the device may use the MCS and the resource block allocation for a transmission of the set of data.

In some examples, the table(s) may also indicate combinations of MCSs and resource block allocations that are associated with codes that are self-decodable. Additionally or alternatively, the table(s) may indicate combinations of MCSs and resource block allocations that are associated with codes that are pseudo-non-self-decodable. A code or data transmission is considered pseudo-non-self-decodable if the data encoded with the code is self-decodable in certain situations but not others. For example, a code may be considered pseudo-non-self-decodable if the code is self-decodable when certain conditions are met. For instance, a code may be pseudo-non-self-decodable if the code strongly depends on a specific few log-likelihood ratios (LLRs) which make the code non-self-decodable in a real life channel (which can be frequency selective and/or dynamic). Thus, a pseudo-non-self-decodable code is distinguishable from a non-self-decodable code, which remains non-selfdecodable regardless of channel conditions. A pseudo-non-self-decodable code may also be referred to herein as a pseudo-self-decodable code.

Although described with reference to a single table, a device may maintain multiple tables each associated with a respective transmission configuration, as described with reference to FIG. 3. A transmission configuration may refer to one more characteristics or parameters associated with a transmission of data, such as the number of times the data is to be transmitted, one or more redundancy versions associated with the data, and/or a HARQ process associated with the data, among others.

In some examples, the techniques described herein may be implemented by UEs engaged in direct communications (e.g., communications between UEs that are not routed through a base station 105). Direct communications between UEs may also be referred to as sidelink communications. In some examples, the techniques described herein may be implemented by UEs engaged in cellular vehicle-to-everything (CV2X) communications. The techniques described herein may be implemented for unicast transmissions, multicast transmissions, or broadcast transmissions, and may be particularly beneficial for broadcast transmissions.

Figure 2:
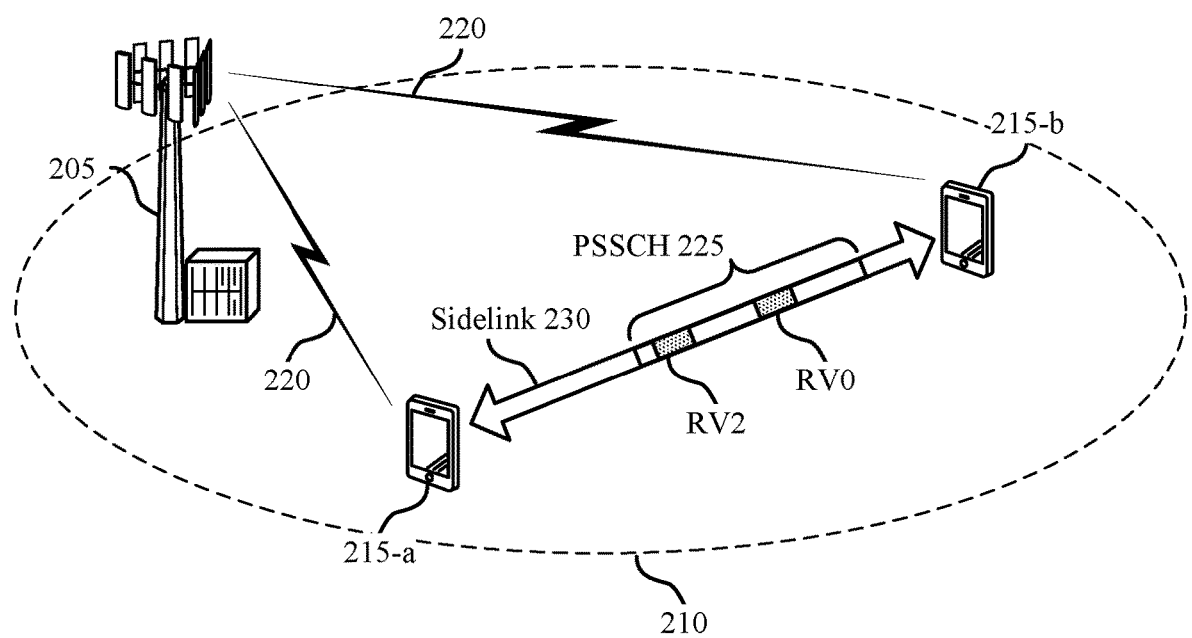
FIG. 2 illustrates an example of a wireless communications subsystem in accordance with aspects of the present disclosure.

FIG. 2 illustrates an example of a wireless communications subsystem 200 that supports improved transmission parameter selection in accordance with aspects of the present disclosure. In some examples, the wireless communications subsystem 200 may implement aspects of wireless communication system 100. For example, the wireless communications subsystem 200 may include base station 205 and UEs 215, which may be examples of a base station or UEs described with reference to FIG. 1. Base station 205 may communicate with the UEs 215 over communication link 220 when the UEs 215 are within coverage area 210, as described with reference to FIG. 1.

In some examples, base station 205 may relay control information and/or data information from one UE 215 to the other UE 215. In other examples, the UEs 215 may communicate directly with each other over sidelink 230 without routing control information and/or data information through the base station 205. In such cases, the communications between the UEs 215 may be controlled or scheduled by the base station 205 or by one of the UEs 215. For example, the resources for the physical sidelink shared channel (PSSCH) 225, which is used to carry data between the UEs 215, may be allocated by base station 205, UE 215-*a*, or UE 215-*b*. Thus, control signaling that facilitates direct communications (e.g., CV2X communication) between the UEs 215 may be exchanged between base station 205, UE 215-*a*, and/or UE 215-*b*.

A UE 215 that wishes to communicate data to another UE 215 may transmit the data once or multiple times. When a UE 215 transmits data multiple times, the UE 215 may transmit different versions (e.g., redundancy versions) of the same data. For instance, UE 215-*a* may transmit a first version (redundancy version 0 "RV0") of a set of data in the PSSCH 225 followed by a second version (redundancy version 2 "RV2") of the set of data. Thus, UE 215-*a* may perform multiple transmissions of the set of data, which may increase the likelihood that the set of data is received and decoded by UE 215-*b*. A UE 215 may determine the number of times to transmit a set of data (and/or the redundancy versions associated with the set of data) autonomously based on a variety of factors and/or based on control signaling from another device (e.g., based on control signaling that indicates a transmission configuration).

Data transmitted (e.g., in a unicast, multicast, or broadcast) from one UE 215 to the other UE 215 may be applied with an MCS prior to transmission and may be conveyed over a set of resource blocks in the PSSCH 225 or another physical channel. A UE 215 may determine the MCS and resource block allocation (e.g., quantity of resource blocks) for a data transmission based on various characteristics of the data and the channel between the UEs 215. For example, a UE 215 may determine the MCS and resource block allocation for a transmission of data based on the transport size needed to accommodate the quantity of bits in the data.

In some examples, the UE 215 may determine the MCS based on the quality of the channel between the UE 215 and the receiving UE 215. For instance, because a high MCS increases the data rate of a transmission, a UE 215 may select a relatively high MCS for a data transmission if the channel has a high level of quality (e.g., a quality level that exceeds a threshold). On the other hand, because high MCSs are more susceptible to degradation caused by poor channel conditions, the UE 215 may select a relatively low MCS for a data transmission if the channel has a low level of quality.

In some examples, the UE 215 may determine the resource block allocation based on the busy ratio of the channel. The busy ratio of a channel may indicate a level of traffic on the channel, a number of devices accessing the channel, an occupancy of the channel, or other metrics associated with the use and/or congestion of the channel. If a channel has a low level of traffic, the UE 215 may select a relatively large resource block allocation for a data transmission to increase the data rate of the transmission. If a channel has a high level of traffic, the UE 215 may select a relatively small resource block allocation for a data transmission to conserve resources of the channel for use by other devices.

Prior to transmitting a set of data (e.g., in a broadcast), a UE 215 may encode the set of data with an error correction code (e.g., a turbo code). The code used to encode the data may be a function of the MCS and resource block allocation selected for the data. But in some cases, the MCS and resource block allocation selected for a set of data results in a code that is non-self-decodable (e.g., due to a subsequent puncturing process). If non-self-decodable code is used to encode data for transmission, the transmitting UE 215 may consume excess power and processing resources transmitting the non-self-decodable data, the receiving UE 215 may consume excess power and processing resources attempting to receive and decode the non-self-decodable data, and excess channel resources (e.g., the resources of PSSCH 225) may be consumed conveying the non-self-decodable data.

According to the techniques described herein, a UE 215 may identify, for a physical channel, a plurality of combinations of MCS and resource block allocations that are associated with non-self-decodable codes. For example, the UE 215 may identify a table that indicates MCS and resource block allocation combinations that are associated with non-self-decodable codes. The UE 215 may check a selected MCS and resource block allocation combination against the table that indicates MCS and resource block allocation combinations that are associated with non-self-decodable codes. If the table indicates that the selected MCS and resource block allocation combination is associated with a non-self-decodable code, the UE 215 may select a new MCS and/or a new resource block allocation so that the new MCS and resource block allocation combination is not associated with a non-self-decodable code. For example, the UE 215 may select a new MCS and resource block allocation combination that is associated with a self-decodable code or a pseudo-non-self-decodable code.

Although described with reference to sidelink communications between two UEs, the techniques described herein can be implemented for any type of communication, including communications between a base station and a UE or between base stations.

Figure 3:
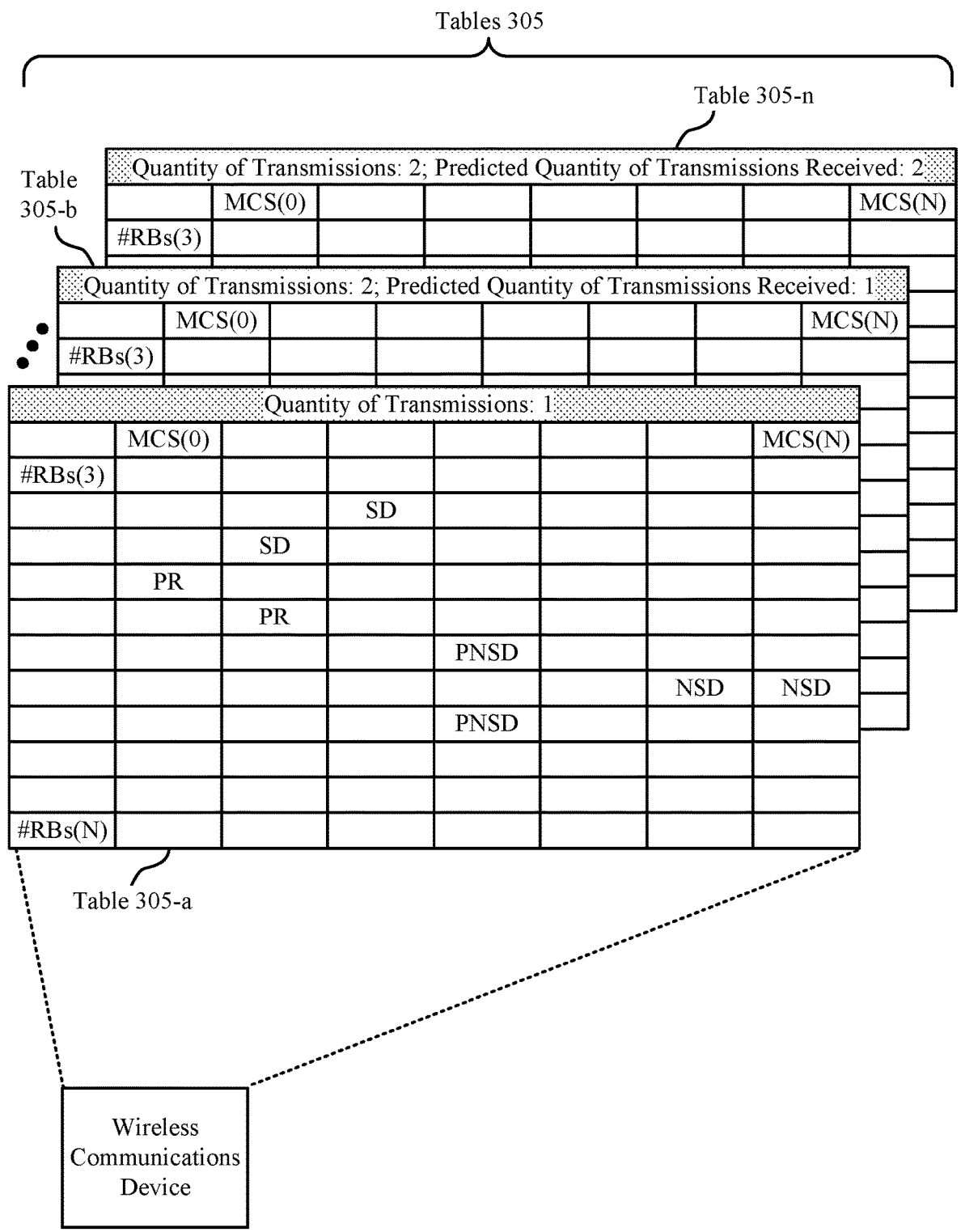
FIG. 3 illustrates an example of a wireless communications device in accordance with aspects of the present disclosure.

FIG. 3 illustrates an example of a wireless communications device 300 that supports improved transmission parameter selection in accordance with aspects of the present disclosure. The wireless communications device 300 may be an example of a base station or UE as described herein. The wireless communications device 300 may include or maintain (e.g., store in memory) one or more tables 305 that indicate the ability of a receiving device to decode codes associated with various pairs of MCSs and resource block allocations. The wireless communications device 300 may identify the tables 305 to ensure that the wireless communications device 300 selects a combination of MCS and resource block allocation that results in a code that is self-decodable or, when the conditions are appropriate, pseudo-non-self-decodable.

The tables 305 may be associated with (e.g., specific to) a particular physical channel. For example, the tables 305 may be associated with PSSCH. However, the wireless communications device 300 may maintain other tables for other physical channels. Although described with reference to tables, the techniques described herein can be implemented using other forms of representation, such as lists.

The tables 305 may include n tables denoted table 305-a through table 305-n, but for ease of illustration only table 305-a, table 305-b, and table 305-n are shown. As noted, each table 305 may indicate the ability of a receiver device to decode codes that result from various combinations of MCSs and resource block allocations. For example, if the wireless communications device 300 supports N+1 MCSs (denoted MCS(0) through MCS(N)) and resource block allocations ranging from three resource blocks (denoted #RBs(3)) to N resource blocks (denoted #RBs(N)), the tables 305 may indicate the ability of a receiving device to decode codes associated with different combinations of the supported MCSs and resource block allocations. For instance, the tables 305 may indicate combinations of MCSs and resource block allocations that are associated with self-decodable (SD) codes, combinations of MCSs and resource block allocations that are associated with pseudo-non-self-decodable (PNSD) codes, and combinations of MCSs and resource block allocations that are associated with non-self-decodable (NSD) codes.

Additionally, the tables 305 may indicate combinations of MCSs and resource block allocations that are preferred (PR) or associated with codes that are preferred. Preferred combinations or codes may be those that provide distinct advantages for certain types of messages. For example, there may be combinations of MCSs and resource block allocations that are preferred for safety messages because they provide the highest likelihood that the message will be received. Preferred combinations may also be referred to as golden configurations. It should be appreciated that the entries indicated as 'SD,' 'PNSD,' 'NSD,' and 'PR' in FIG. 3 are for illustrative purposes alone and are not limiting. Additionally, the tables 305 may indicate additional or alternative information for the combinations of MCSs and resource block allocations. For example, the tables 305 may indicate combinations of MCSs that are prohibited (e.g., the combinations of MCSs and resource block allocations that are associated with non-self-decodable codes) or combinations of MCSs that are permitted when certain conditions are satisfied (e.g., the combinations of MCSs and resource block allocations that are associated with pseudo-non-self-decodable codes).

Each table 305 may be associated with a respective transmission configuration and/or reception status prediction, and the entries in the table may be based on the associated respective transmission configuration and/or reception status. A reception status prediction may refer to the quantity transmissions—of the same set of data—a receiving device is predicted to successfully receive. For instance, the reception status prediction for table 305-b indicates that of two transmissions of a set of data, only one with be received by the receiving device.

As an example, table 305-a may be associated with a transmission configuration that indicates a single transmission and a single redundancy version (e.g., RV0). Thus, the entries in table 305-a may be different than the entries in table 305-b, which may be associated with 1) a transmission configuration that indicates two transmissions and two redundancy versions (RV0, RV2), and 2) a reception status prediction that indicates a single transmission will be received by the receiving device. Further, the entries in table 305-b may be different than the entries in table 305-n, which may be associated with the same transmission configuration as table 305-b but a different reception status prediction (e.g., a reception status prediction that indicates two transmissions will be received by the receiving device).

Accordingly, the wireless communications device 300 may identify a table 305 for use in selecting transmission parameters (e.g., MCS and resource block allocation) for a set of data based on the transmission configuration associated with set of data and the reception status prediction associated with the set of data.

In some examples, one or more of the tables 305 included in the wireless communications device 300 may be common to some or all of the devices in the wireless communications system. Put another way, some or all of the devices (e.g., those configured with the same puncture process) in the wireless communications system may be configured with the same tables. Such an implementation is possible because the ability of a receiving device to decode a turbo code (or other code) is a function of the encoder, as opposed to a function of the decoder. That is, the combinations of MCSs and resource block allocations associated with non-self-decodable codes are independent of the decoder used to decode the codes. Thus, the devices in the wireless communications system may each be configured with the same table(s), regardless of the decoding capabilities of the devices.

In some examples, the tables 305 may be divided into multiple tables. For example, table 305-a may be represented by a first table that indicates combinations of MCSs and resource block allocations that are associated with non-self-decodable codes, a second table that indicates combinations of MCSs and resource block allocations that are associated with pseudo-non-self-decodable codes, a third table that indicates combinations of MCSs and resource block allocations that are associated with self-decodable codes, or a combination thereof.

Figure 4:
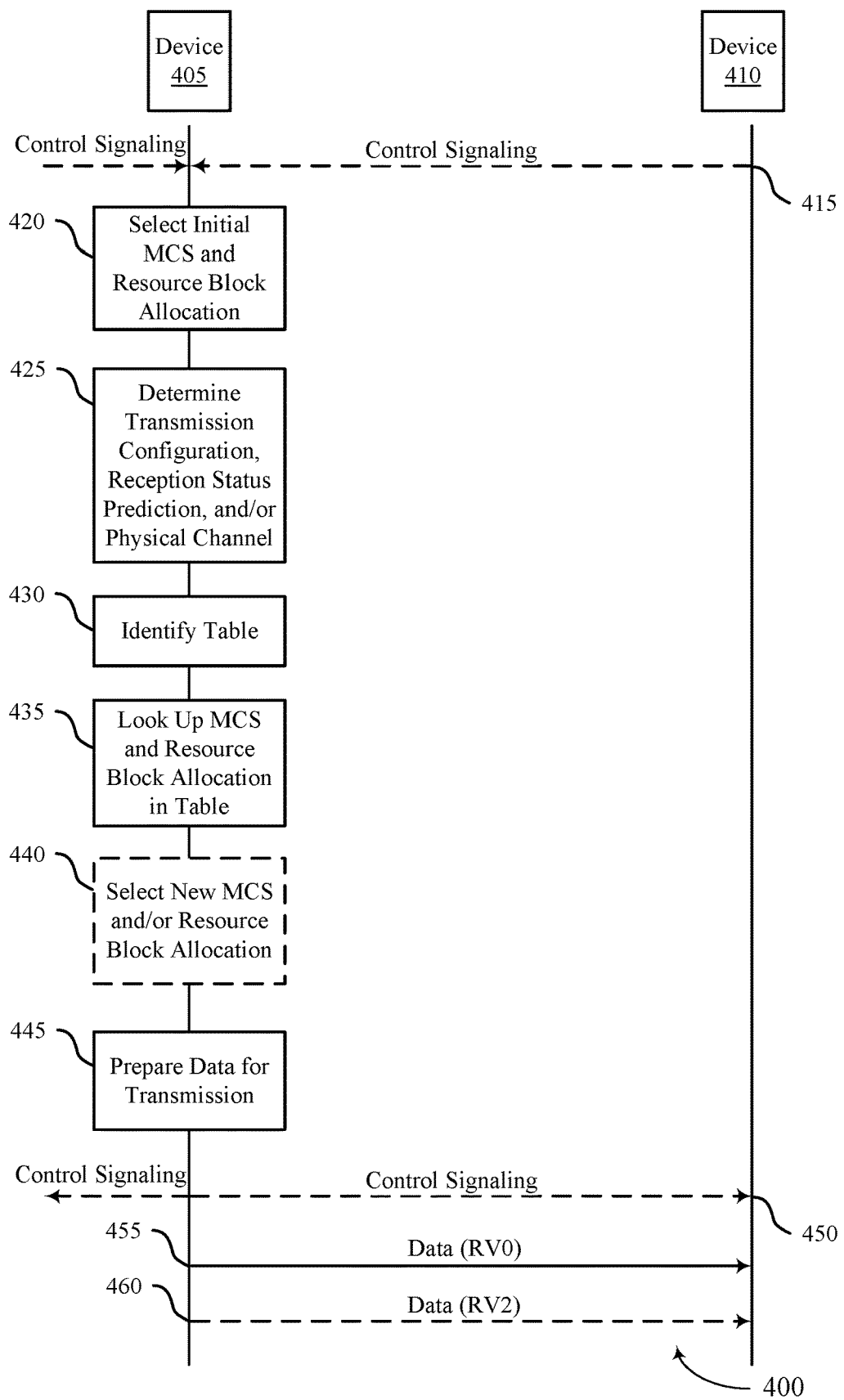
FIG. 4 illustrates an example of a process flow in accordance with aspects of the present disclosure.

FIG. 4 illustrates an example of a process flow 400 that supports improved transmission parameter selection in accordance with aspects of the present disclosure. In some examples, the process flow 400 may implement aspects of wireless communication system 100. For example, the process flow 400 may be performed by a device 405 and a device 410, which may be examples of base stations, UEs, or wireless devices as described herein. Process flow 400 may be implemented by a device to facilitate the selection of transmission parameters (e.g., MCS, resource block allocation) that, when used as a basis for code generation, yield a code that is self-decodable or pseudo-self-decodable.

One skilled in the art would understand that one or more of the operations described in process flow 400 may be performed earlier or later in the process flow 400. Additionally, one or more of the operations described in the process flow 400 may be omitted, replaced, or supplemented, or any combination thereof. Also, the process flow 400 may include additional operations described herein but not shown in FIG. 4.

At 415, the device 405 may receive control signaling from one or more devices. For example, the device 405 may receive control signaling from the device 410 and/or control signaling from a third device, such as a base station. The control signaling may coordinate one or more aspects of communications between the device 405 and the device 410. For example, the control signaling may indicate a resource pool for PSSCH so that data can be transmitted from the device 405 to the device 410. In some examples, the control signaling may indicate one or more tables, such as tables 305, or lists that indicate combinations of MCSs and resource block allocations that are associated with self-decodable codes, non-self-decodable codes, pseudo-self-decodable codes, or preferred codes. In some examples, the control signaling may indicate a transmission configuration the device 405 is to use (e.g., for one or more subsequent transmissions of data to the device 410).

At 420, the device 405 may select a set of transmission parameters for an upcoming transmission of a set of data. For example, the device 405 may select an MCS and a resource block allocation for an upcoming transmission of a set of data. The MCS may be selected based on the control signaling received at 415, the size of the set of data, and/or a channel quality, among other factors. The resource block allocation may be selected based on the control signaling received at 415, the size of the set of data, and/or a busy ratio for the channel, among other factors. In some examples, the resource block allocation may represent a quantity of resource blocks in the resource pool allocated for PSSCH.

At 425, the device 405 may determine one or more aspects associated with the upcoming transmission of the set of data. For example, the device 405 may determine the transmission configuration, which may indicate the quantity of times the set of data is to be transmitted and/or the redundancy versions associated with transmissions of the set of data. If the quantity of transmissions is greater than one, the device 405 may predict the reception status for the transmissions (e.g., the quantity of transmissions most likely to be received by the device 410). Additionally or alternatively, the device 405 may determine the physical channel over which the set of data is scheduled to be transmitted, along with one or more characteristics of the physical channel (e.g., channel quality). The characteristics of the channel may be a basis for determining, e.g., at 440, whether to use a pseudo-self-decodable code.

At 430, the device 405 may identify a table, such as a table 305, to reference. The table may be identified based on the physical channel, the transmission configuration, and/or the reception status prediction, among other factors.

At 435, the device 405 may look up in the identified table the selected combination of MCS and resource block allocation to determine the type of code (e.g., self-decodable, non-self-decodable, pseudo-non-self-decodable, preferred) associated with the combination. If the code associated with the combination is self-decodable or preferred, the device 405 may use the MCS for preparing the set of data at 445 and may use the resource block allocation for transmission of the set of data at 450. If the code associated with the combination is pseudo-self-decodable, the device 405 may determine (e.g., based on channel characteristics determined at 425) whether conditions are appropriate for use of the pseudo-non-decodable code. If the conditions are appropriate, the device 405 may use the MCS for preparing the set of data at 445 and may use the resource block allocation for transmission of the set of data at 450. If the conditions are not appropriate, the device 405 may select a new MCS and/or resource block allocation at 440. Similarly, if the code associated with the combination is non-self-decodable, the device 405 may select a new MCS and/or resource block allocation at 440. The new combination of MCS and resource block allocation may be associated with a self-decodable code, or, if the conditions are appropriate, a pseudo-self-decodable code. Alternatively, in some examples, the device 405 may keep the selected combination of MCS and resource block allocation even though the selected combination is associated with a non-self-decodable code.

At 445, the device 405 may prepare the set of data for transmission over the physical channel. For example, after finalizing the combination of the MCS and resource block allocation, the device 405 may apply the set of data with the MCS and encode the data with the code associated with the finalized MCS and resource block allocation. In some examples, the device 405 may also puncture the encoded set of data prior to transmission.

At 450, the device 405 may transmit control signaling to one or more devices. For example, the device 405 may transmit control signaling to the device 410 and/or control signaling to a third device, such as a base station. The control signaling may coordinate one or more aspects of communications between the device 405 and the device 410. For example, the control signaling may indicate the physical channel resources over which the set of data will be transmitted. Additionally or alternatively, the control signaling may indicate the transmission configuration for the set of data.

At 455, the device 405 may transmit (e.g., in a unicast, multicast, or broadcast) a first version of the encoded set of data based on the transmission configuration. The set of data may be transmitted over the physical channel in resources of that are commensurate with the resource block allocation. At 460, the device 405 may transmit (e.g., in a unicast, multicast, or broadcast) a second version of the encoded set of data based on the transmission configuration. Both transmissions of data may be encoded with the same code that was generated based on the MCS and resource block allocation.

Thus, the device 405 may use a table as described herein to select a combination of MCS and resource block allocations that results in a code that is self-decodable or pseudo-self-decodable.

Figure 5:
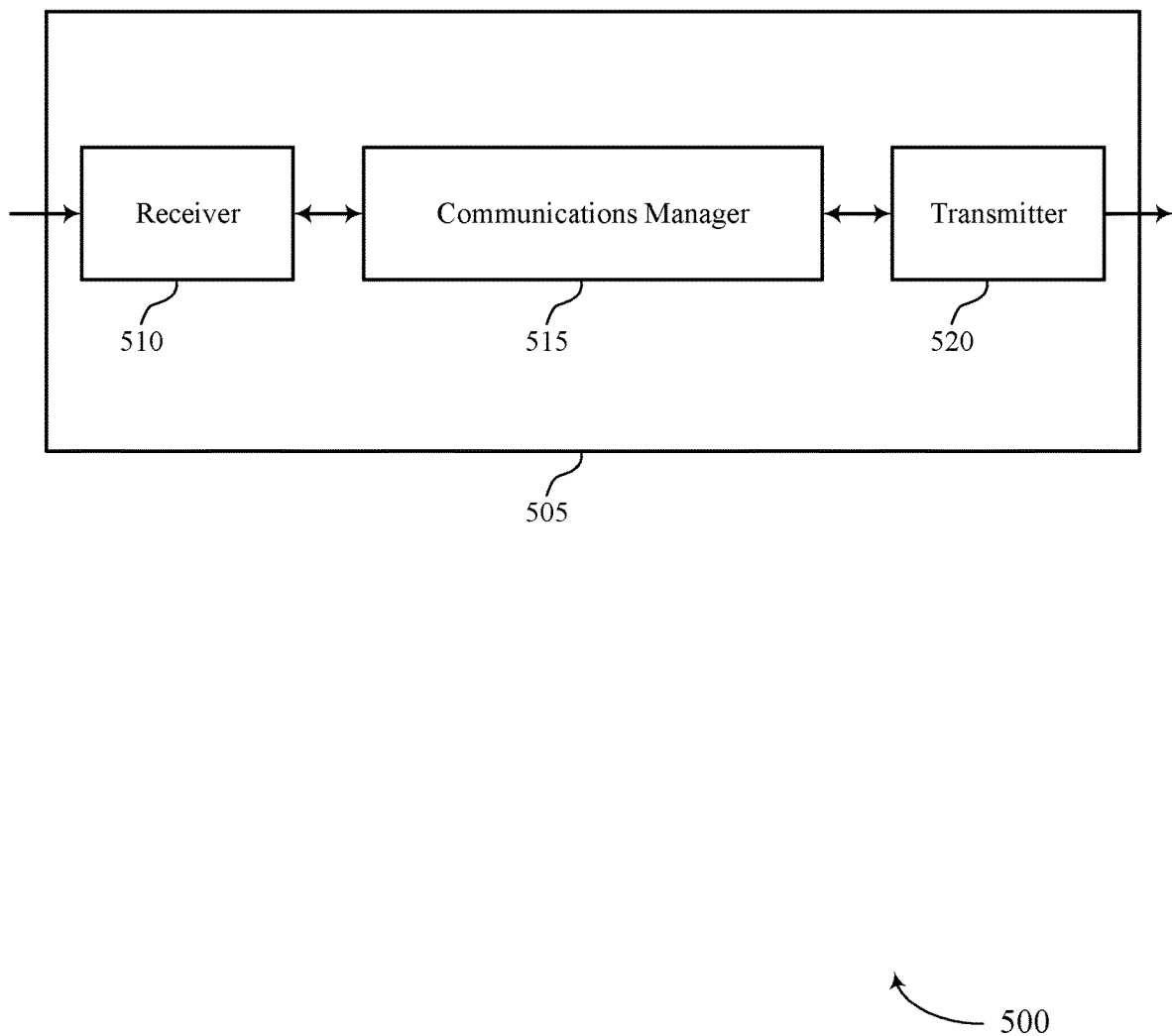
FIGS. 5 and 6 show block diagrams of devices in accordance with aspects of the present disclosure.

FIG. 5 shows a block diagram 500 of a device 505 that supports improved transmission parameter selection in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to improved transmission parameter selection, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify, for a physical channel, a set of combinations of modulation and coding schemes and resource block allocations that are associated with non-self-decodable codes, select a combination of a modulation and coding scheme and a resource block allocation based on the set of combinations of modulation and coding schemes and resource block allocations that are associated with non-self-decodable codes, and transmit data over the physical channel in a communication generated using the selected combination of the modulation and coding scheme and the resource block allocation. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

By including or configuring the communications manager 515 in accordance with examples as described herein, the device 505 (e.g., a processor controlling or otherwise coupled to the receiver 510, the transmitter 520, the communications manager 515, or a combination thereof) may support techniques for reduced processing, reduced power consumption, and more efficient utilization of communication resources.

Figure 6:
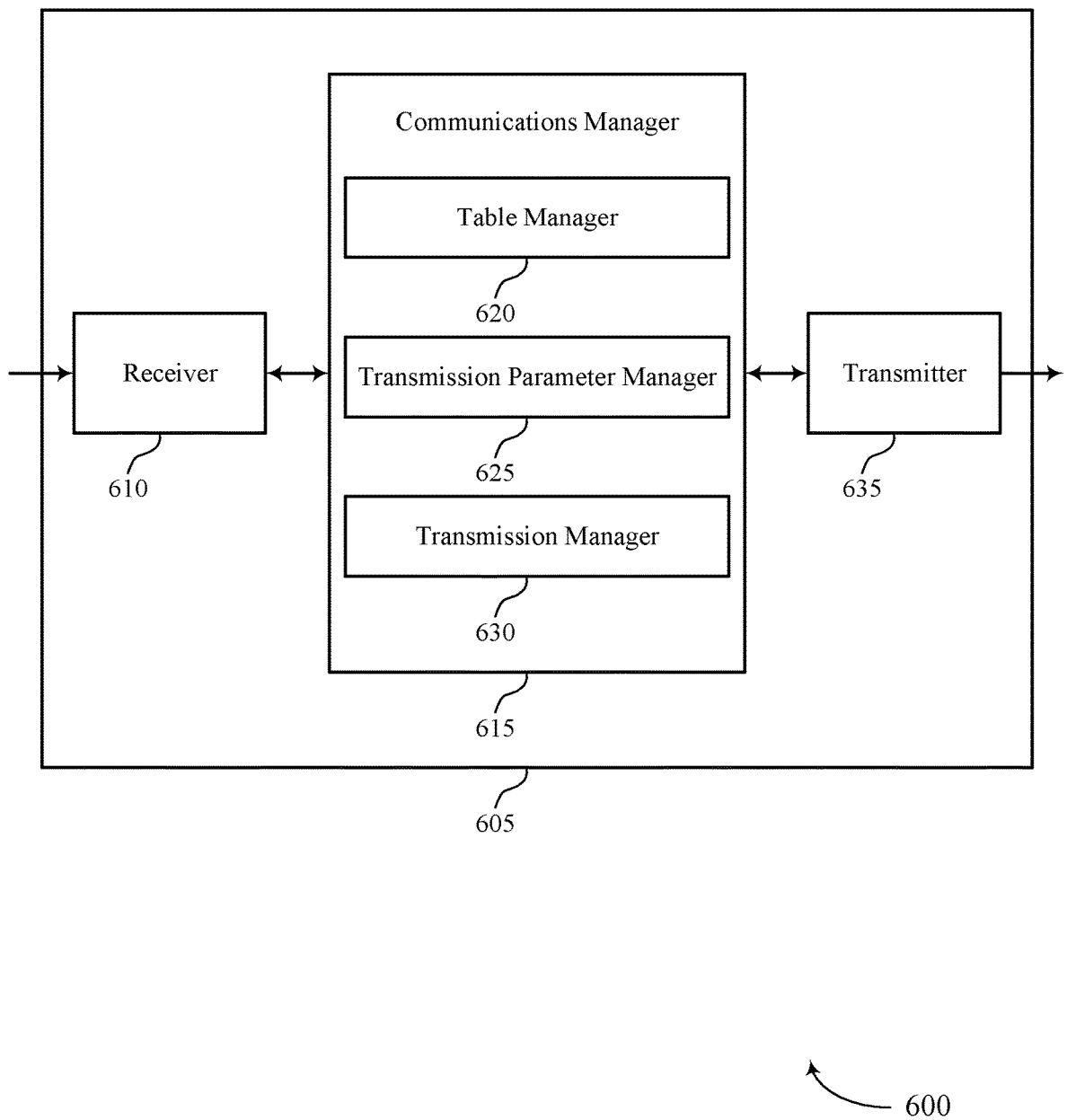

FIG. 6 shows a block diagram 600 of a device 605 that supports improved transmission parameter selection in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to improved transmission parameter selection, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a table manager 620, a transmission parameter manager 625, and a transmission manager 630. The communications manager 615 may be an example of aspects of the communications manager 810 described herein.

The table manager 620 may identify, for a physical channel, a set of combinations of modulation and coding schemes and resource block allocations that are associated with non-self-decodable codes. For example, the table manager 620 may identify a table 305.

The transmission parameter manager 625 may select a combination of a modulation and coding scheme and a resource block allocation based on the set of combinations of modulation and coding schemes and resource block allocations that are associated with non-self-decodable codes.

The transmission manager 630 may transmit data over the physical channel in a communication generated using the selected combination of the modulation and coding scheme and the resource block allocation.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
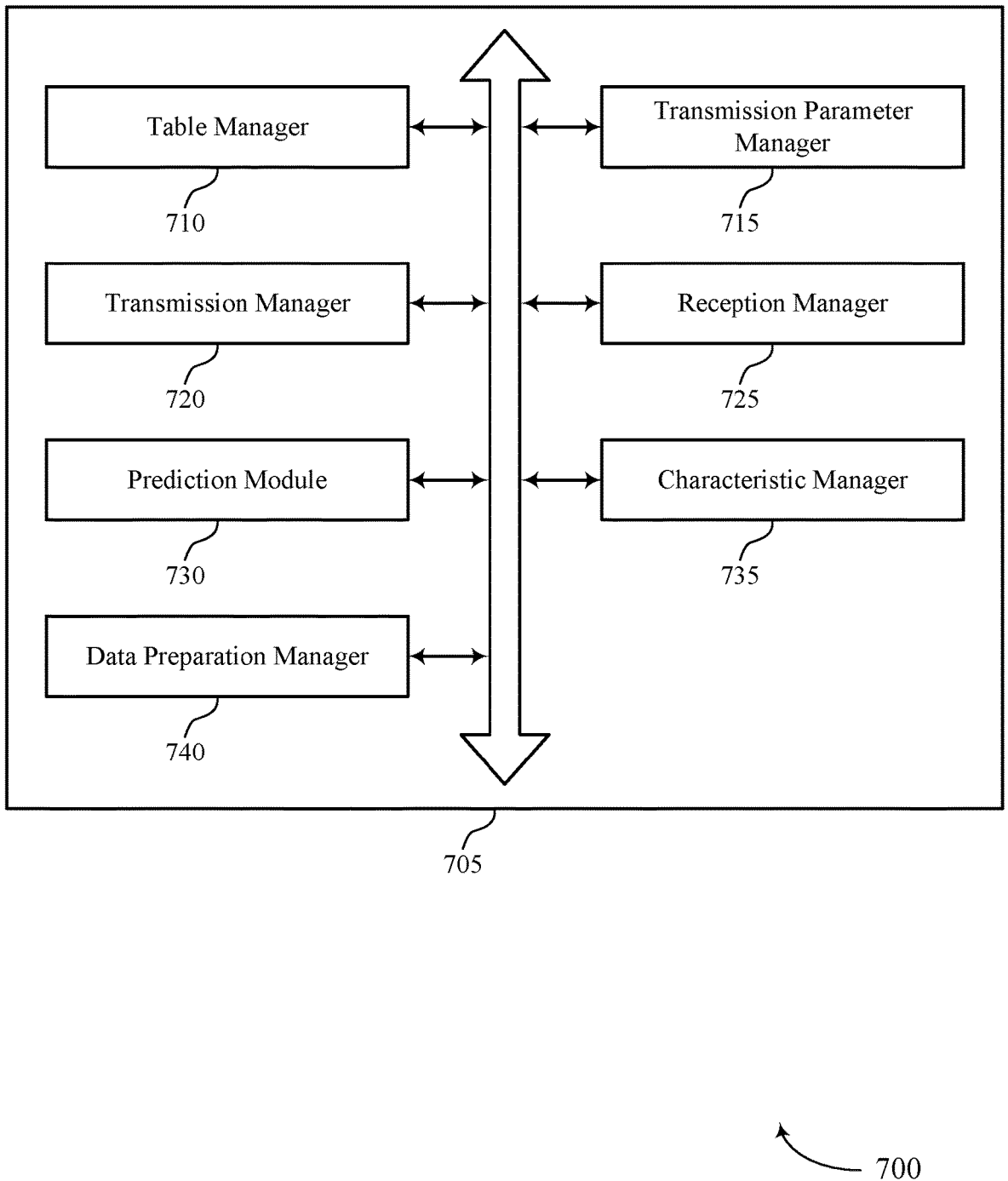
FIG. 7 shows a block diagram of a communications manager in accordance with aspects of the present disclosure.

FIG. 7 shows a block diagram 700 of a communications manager 705 that supports improved transmission parameter selection in accordance with aspects of the present disclosure. The communications manager 705 may be an example of aspects of a communications manager 515, a communications manager 615, or a communications manager 810 described herein. The communications manager 705 may include a table manager 710, a transmission parameter manager 715, a transmission manager 720, a reception manager 725, a prediction module 730, a characteristic manager 735, and a data preparation manager 740. Each of these modules may communicate, directly or indirectly, with one another (e.g., via one or more buses).

The table manager 710 may identify, for a physical channel, a set of combinations of modulation and coding schemes and resource block allocations that are associated with non-self-decodable codes. In some cases, the physical channel is a PSSCH. The transmission parameter manager 715 may select a combination of a modulation and coding scheme and a resource block allocation based on the set of combinations of modulation and coding schemes and resource block allocations that are associated with non-self-decodable codes. The transmission manager 720 may transmit data over the physical channel in a communication generated using the selected combination of the modulation and coding scheme and the resource block allocation. In some examples, transmitting the data includes performing a CV2X transmission.

In some examples, the table manager 710 may identify a second set of combinations of modulation and coding schemes and resource block allocations that are associated with self-decodable codes or pseudo-non-self-decodable codes, where the combination of the modulation and coding scheme and the resource block allocation is selected based on the second set of combinations.

In some cases, the set of combinations of modulation and coding schemes and resource block allocations in the first table is determined based on the physical channel, a number of redundancy versions, a predicted number of transmissions to be received by a wireless device, or a combination thereof.

In some examples, the transmission parameter manager 715 may determine an initial combination of an initial modulation and coding scheme and an initial resource block allocation for the transmission of the data. In some examples, the transmission parameter manager 715 may select the combination of the modulation and coding scheme and the resource block allocation based on the initial combination of the initial modulation and coding scheme and the initial resource block allocation being associated with a non-self-decodable code. In some cases, the combination of the modulation and coding scheme and the resource block allocation includes a modulation and coding scheme that is different than the initial modulation and coding scheme, a resource block allocation that is different than the initial resource block allocation, or a combination thereof.

In some examples, the transmission manager 720 may transmit, to a wireless device, an indication of the selected combination.

The reception manager 725 may receive control signaling that indicates that the set of combinations of modulation and coding schemes and resource block allocations are associated with non-self-decodable codes.

In some examples, the reception manager 725 may receive control signaling that indicates a first table of a set of tables, where the first table includes the set of combinations of modulation and coding schemes and resource block allocations.

In some examples, the reception manager 725 may receive control signaling that indicates the set of tables including the first table, where each table is associated with a respective transmission configuration of a set of transmission configurations.

In some examples, the reception manager 725 may receive control signaling to indicate to apply a first transmission configuration of the set of transmission configurations, where the set of combinations of modulation and coding schemes and resource block allocations are identified based on the first transmission configuration.

In some examples, the reception manager 725 may receive a transmission configuration that indicates one or more redundancy versions or a number of transmissions of the data, where the set of combinations is identified based on the one or more redundancy versions or the number of transmissions.

In some examples, the reception manager 725 may receive a transmission configuration that indicates to transmit the data a single time, where the set of combinations is identified based on the transmission configuration.

In some examples, the reception manager 725 may receive a transmission configuration that indicates to transmit the data multiple times, where the set of combinations is identified based on the transmission configuration.

The prediction module 730 may identify the set of combinations based on a predicted number of transmissions of the data to be received by a wireless device.

In some examples, the prediction module 730 may determine that a single transmission of the data will be received by a wireless device, where the set of combinations is identified based on determining that the single transmission of the data will be received at the wireless device.

In some examples, the prediction module 730 may determine that both the transmission of the data and the second transmission of the data will be received by a wireless device, where the set of combinations is identified based on determining that both the transmission of the data and the second transmission of the data will be received by the wireless device.

The characteristic manager 735 may determine a quantity of bits of the data, a busy ratio for the physical channel, a quality of the physical channel, or a combination thereof, where the initial combination is determined based on the quantity of bits of the data, the busy ratio for the physical channel, the quality of the physical channel, or a combination thereof.

The data preparation manager 740 may encode the data using a turbo code that is based on the combination of the modulation and coding scheme and the resource block allocation. In some examples, data preparation manager 740 may puncture the encoded data, where transmitting the data includes transmitting the punctured encoded data.

Figure 8:
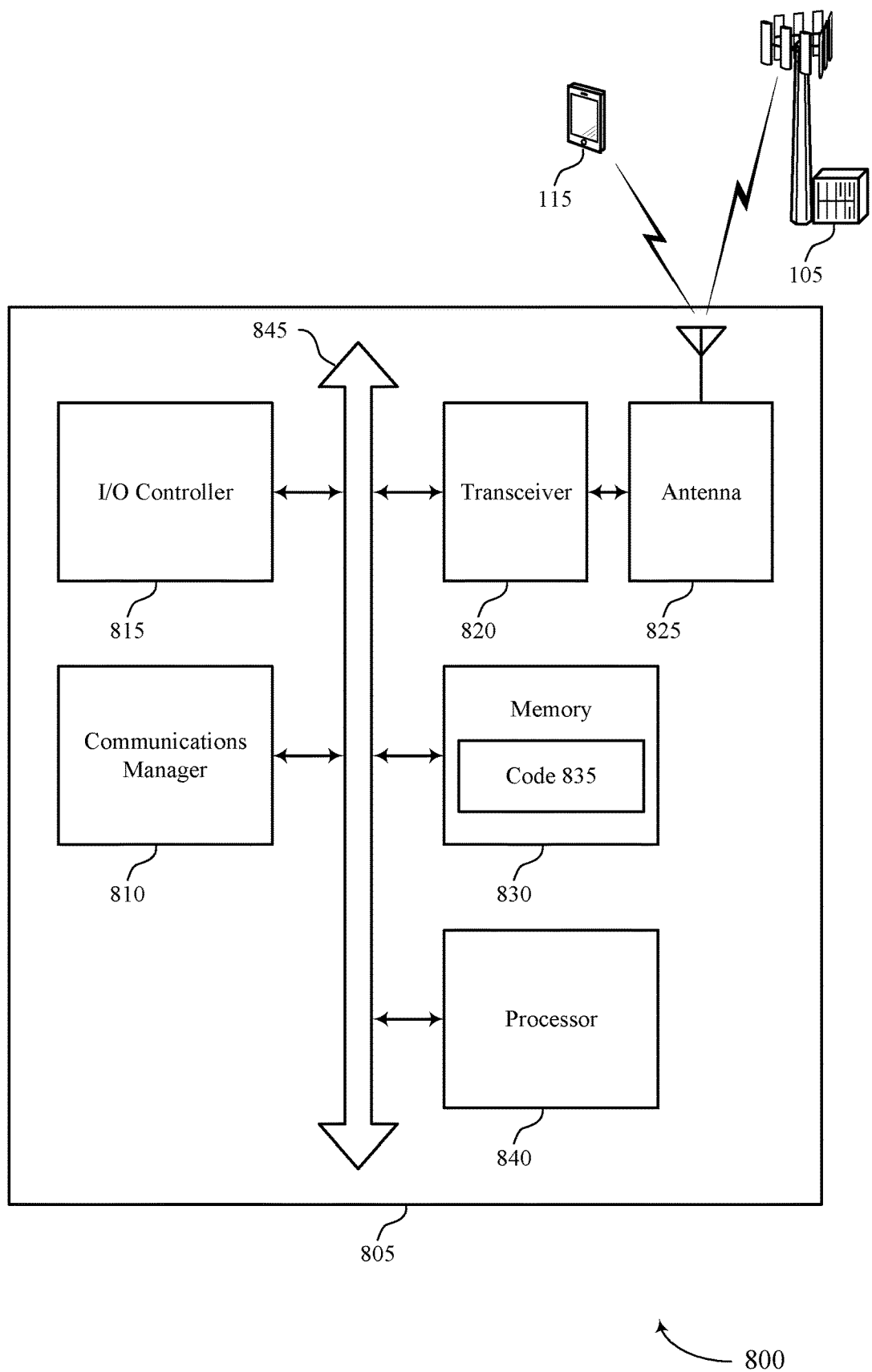
FIG. 8 shows a diagram of a system including a device in accordance with aspects of the present disclosure.

FIG. 8 shows a diagram of a system 800 including a device 805 that supports improved transmission parameter selection in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify, for a physical channel, a set of combinations of modulation and coding schemes and resource block allocations that are associated with non-self-decodable codes, select a combination of a modulation and coding scheme and a resource block allocation based on the set of combinations of modulation and coding schemes and resource block allocations that are associated with non-self-decodable codes, and transmit data over the physical channel in a communication generated using the selected combination of the modulation and coding scheme and the resource block allocation.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touch-screen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting improved transmission parameter selection).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
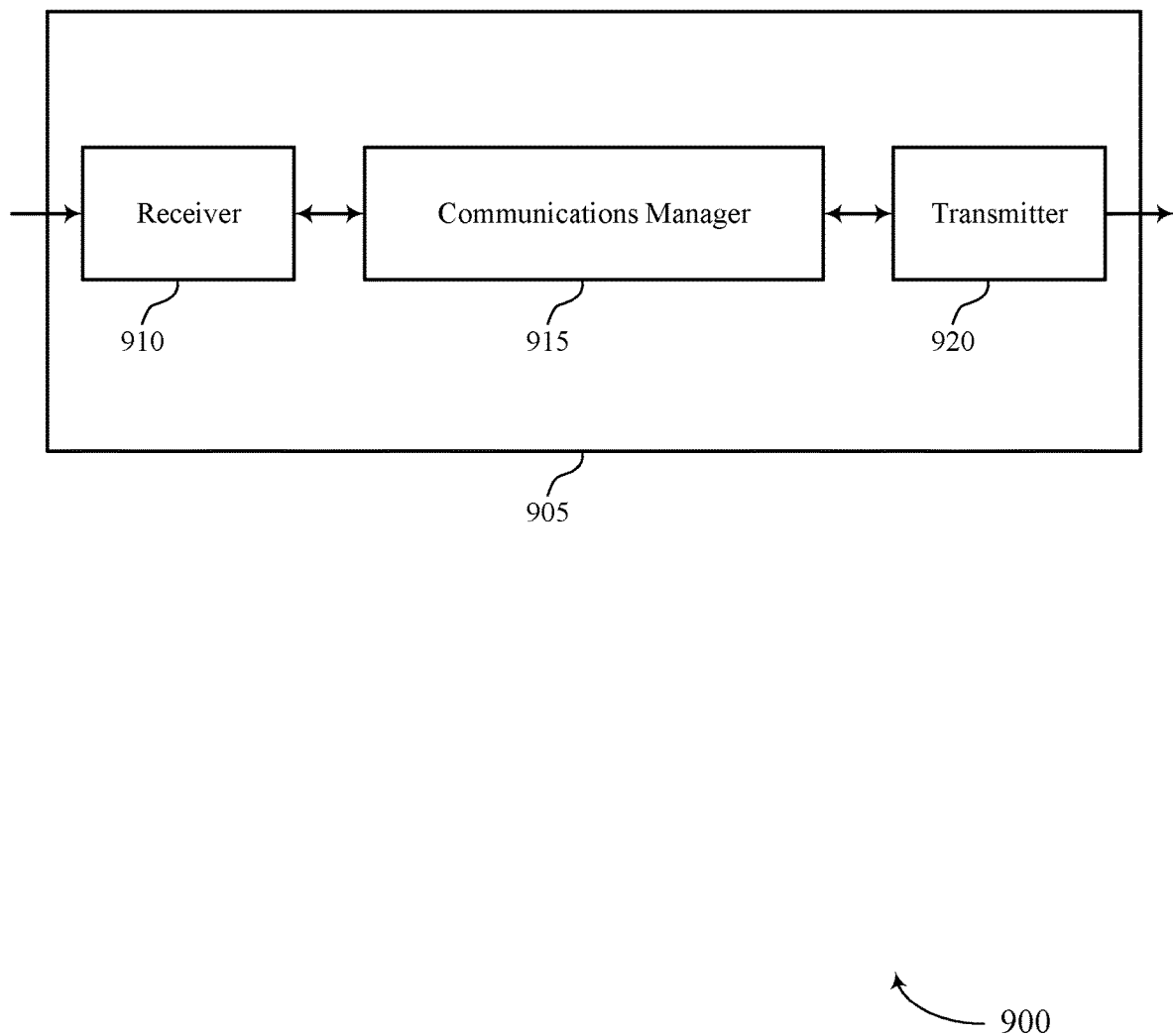
FIGS. 9 and 10 show block diagrams of devices in accordance with aspects of the present disclosure.

FIG. 9 shows a block diagram 900 of a device 905 that supports improved transmission parameter selection in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to improved transmission parameter selection, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit control signaling that indicates a set of combinations of modulation and coding scheme and resource block allocations that are associated with non-self-decodable codes, receive, based on transmitting the control signaling, an indication of a selected combination of a modulation and coding scheme and a resource block allocation, and receive, over a physical channel, data in a communication generated using the selected combination of the modulation and coding scheme and the resource block allocation. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

By including or configuring the communications manager 915 in accordance with examples as described herein, the device 905 may support techniques for reduced processing, reduced power consumption, and more efficient utilization of communication resources.

Figure 10:
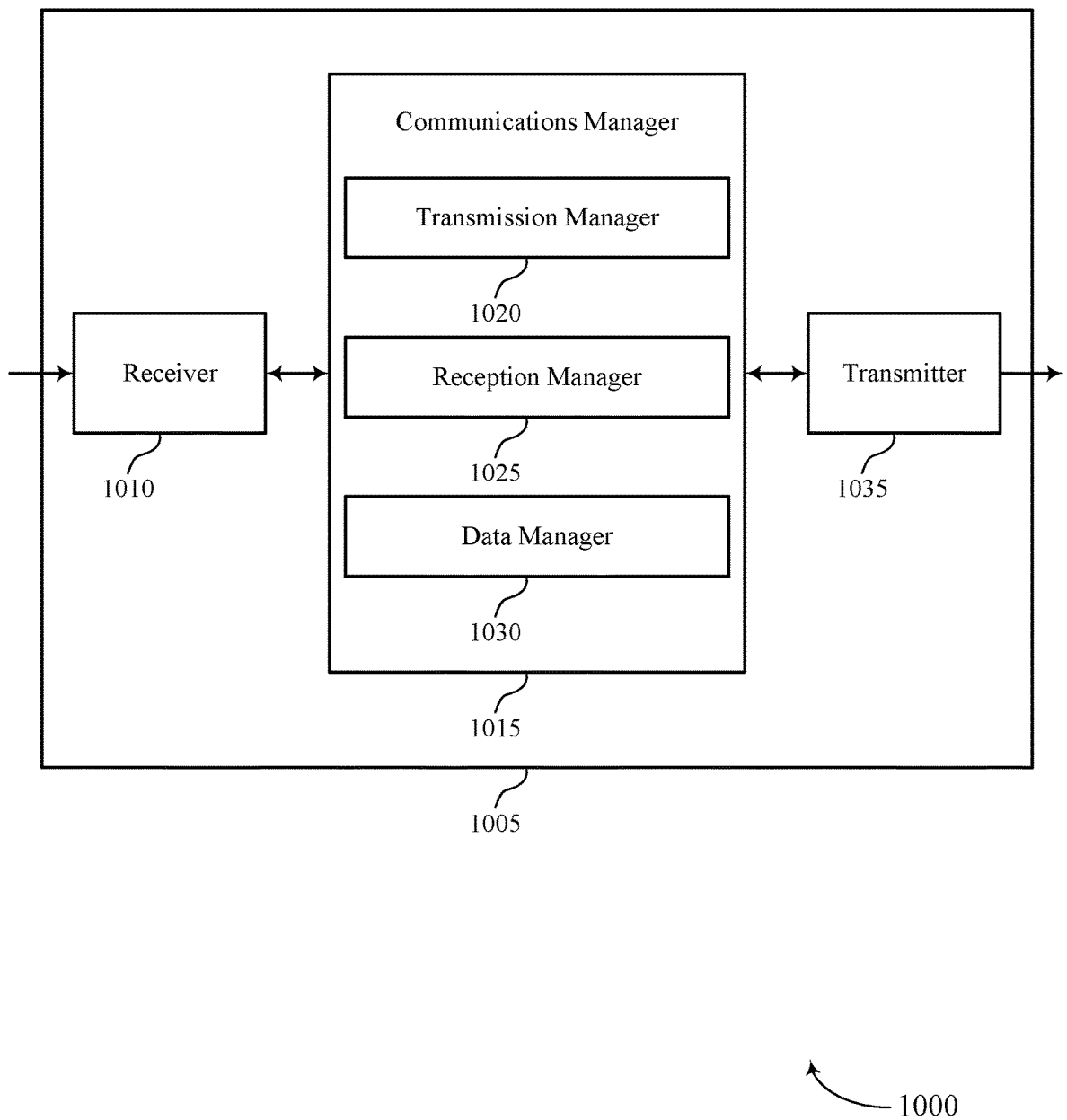

FIG. 10 shows a block diagram 1000 of a device 1005 that supports improved transmission parameter selection in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to improved transmission parameter selection, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a transmission manager 1020, a reception manager 1025, and a data manager 1030. The communications manager 1015 may be an example of aspects of the communications manager 1210 described herein.

The transmission manager 1020 may transmit control signaling that indicates a set of combinations of modulation and coding scheme and resource block allocations that are associated with non-self-decodable codes.

The reception manager 1025 may receive, based on transmitting the control signaling, an indication of a selected combination of a modulation and coding scheme and a resource block allocation.

The data manager 1030 may receive, over a physical channel, data in a communication generated using the selected combination of the modulation and coding scheme and the resource block allocation.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
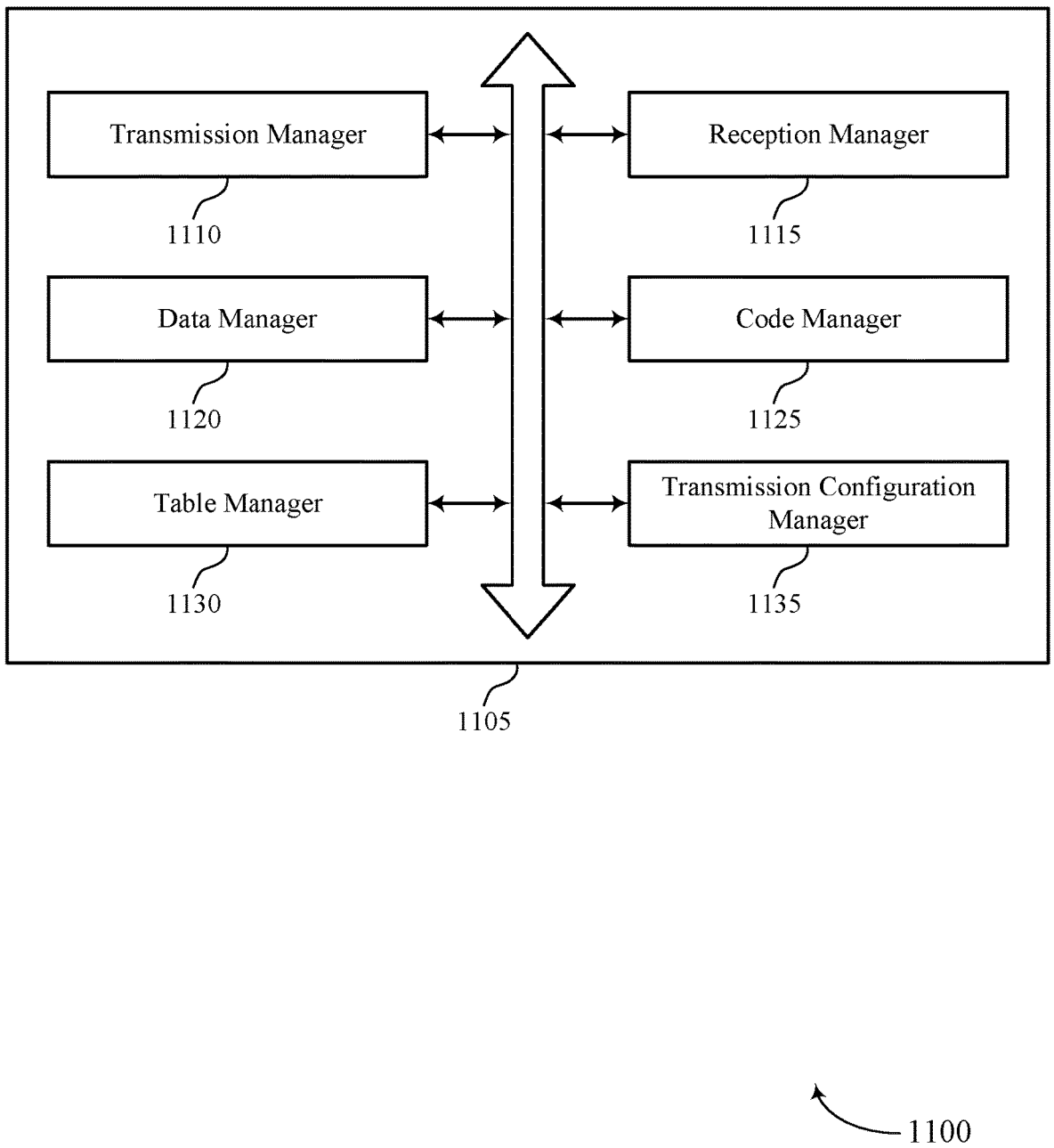
FIG. 11 shows a block diagram of a communications manager in accordance with aspects of the present disclosure.

FIG. 11 shows a block diagram 1100 of a communications manager 1105 that supports improved transmission parameter selection in accordance with aspects of the present disclosure. The communications manager 1105 may be an example of aspects of a communications manager 915, a communications manager 1015, or a communications manager 1210 described herein. The communications manager 1105 may include a transmission manager 1110, a reception manager 1115, a data manager 1120, a code manager 1125, a table manager 1130, and a transmission configuration manager 1135. Each of these modules may communicate, directly or indirectly, with one another (e.g., via one or more buses).

The transmission manager 1110 may transmit control signaling that indicates a set of combinations of modulation and coding scheme and resource block allocations that are associated with non-self-decodable codes.

The reception manager 1115 may receive, based on transmitting the control signaling, an indication of a selected combination of a modulation and coding scheme and a resource block allocation.

The data manager 1120 may receive, over a physical channel, data in a communication generated using the selected combination of the modulation and coding scheme and the resource block allocation.

In some examples, receiving the data includes receiving the data in a CV2X transmission. In some cases, the physical channel is a PSSCH.

The code manager 1125 may transmit control signaling that indicates that the set of combinations of modulation and coding schemes and resource block allocations are associated with non-self-decodable codes.

The table manager 1130 may transmit control signaling that indicates a first table of a set of tables, where the first table includes the set of combinations of modulation and coding schemes and resource block allocations.

In some examples, the table manager 1130 may transmit control signaling that indicates a set of tables including the first table, where each table is associated with a respective transmission configuration of a set of transmission configurations.

In some examples, the table manager 1130 may transmit control signaling to indicate to apply a first transmission configuration of the set of transmission configurations, where the set of combinations of modulation and coding schemes and resource block allocations are identified based on the first transmission configuration.

In some cases, the set of combinations of modulation and coding schemes and resource block allocations in the first table is determined based on the physical channel, a number of redundancy versions, a predicted number of transmissions to be received by a wireless device, or a combination thereof.

In some cases, the control signaling indicates a second set of combinations of modulation and coding schemes and resource block allocations that are associated with self-decodable codes, a third set of combinations of modulation and coding schemes and resource block allocations that are associated with pseudo-non-self-decodable codes, or a combination thereof.

The transmission configuration manager 1135 may transmit a transmission configuration that indicates one or more redundancy versions or a number of transmissions of the data, where the set of combinations is identified based on the one or more redundancy versions or the number of transmissions.

In some examples, the transmission configuration manager 1135 may transmit a transmission configuration that indicates to transmit the data a single time, where the set of combinations is identified based on the transmission configuration.

In some examples, the transmission configuration manager 1135 may transmit a transmission configuration that indicates to transmit the data multiple times, where the set of combinations is identified based on the transmission configuration.

Figure 12:
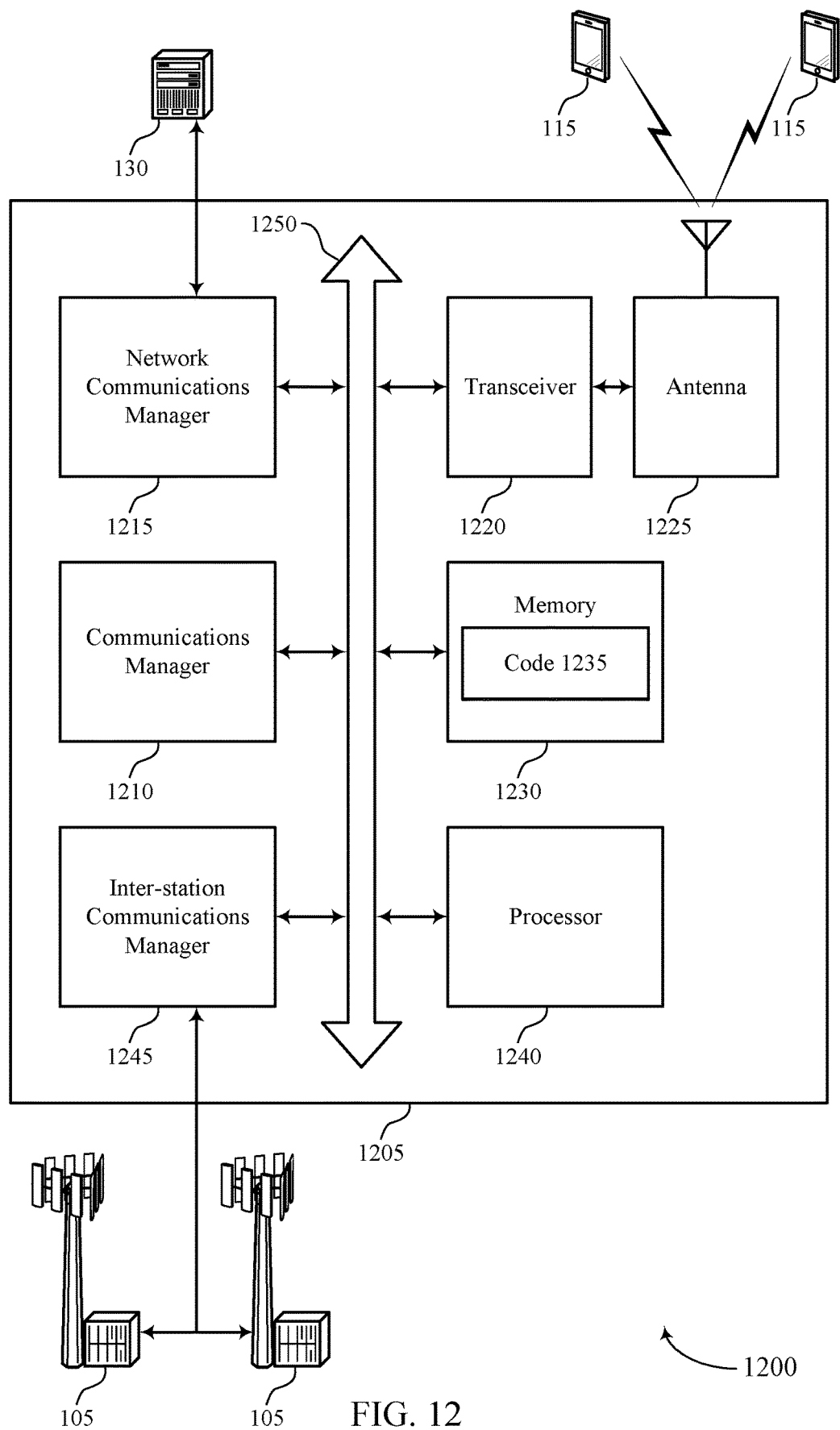
FIG. 12 shows a diagram of a system including a device in accordance with aspects of the present disclosure.

FIG. 12 shows a diagram of a system 1200 including a device 1205 that supports improved transmission parameter selection in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit control signaling that indicates a set of combinations of modulation and coding scheme and resource block allocations that are associated with non-self-decodable codes, receive, based on transmitting the control signaling, an indication of a selected combination of a modulation and coding scheme and a resource block allocation, and receive, over a physical channel, data in a communication generated using the selected combination of the modulation and coding scheme and the resource block allocation.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting improved transmission parameter selection).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
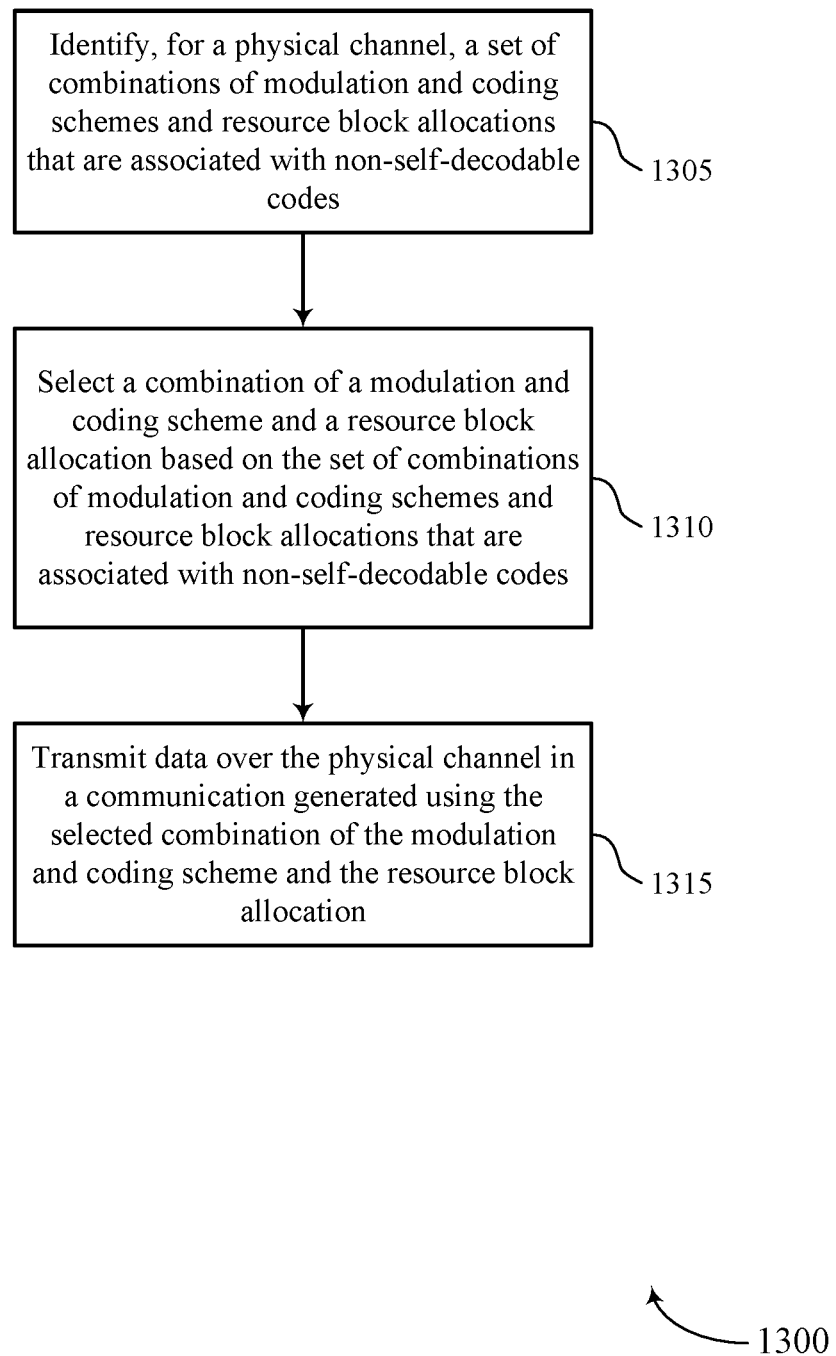
FIGS. 13 and 14 show flowcharts illustrating methods in accordance with aspects of the present disclosure.

FIG. 13 shows a flowchart illustrating a method 1300 that supports improved transmission parameter selection in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify, for a physical channel, a set of combinations of modulation and coding schemes and resource block allocations that are associated with non-self-decodable codes. The operations of 1305 may be performed according to the methods described herein. In some examples, aspects of the operations of 1305 may be performed by a table manager as described with reference to FIGS. 5 through 8.

At 1310, the UE may select a combination of a modulation and coding scheme and a resource block allocation based on the set of combinations of modulation and coding schemes and resource block allocations that are associated with non-self-decodable codes. The operations of 1310 may be performed according to the methods described herein. In some examples, aspects of the operations of 1310 may be performed by a transmission parameter manager as described with reference to FIGS. 5 through 8.

At 1315, the UE may transmit data over the physical channel in a communication generated using the selected combination of the modulation and coding scheme and the resource block allocation. The operations of 1315 may be performed according to the methods described herein. In some examples, aspects of the operations of 1315 may be performed by a transmission manager as described with reference to FIGS. 5 through 8.

Figure 14:
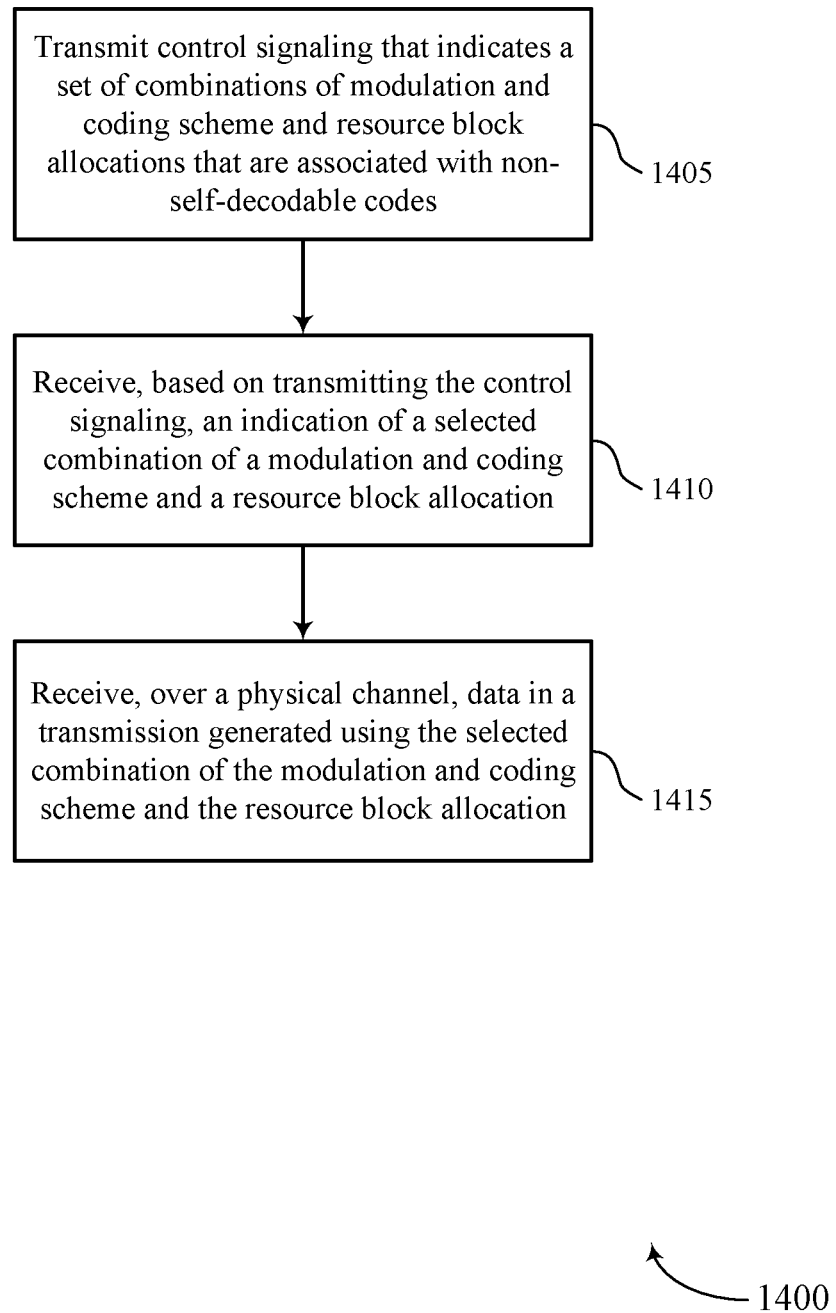

FIG. 14 shows a flowchart illustrating a method 1400 that supports improved transmission parameter selection in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may transmit control signaling that indicates a set of combinations of modulation and coding scheme and resource block allocations that are associated with non-self-decodable codes. The operations of 1405 may be performed according to the methods described herein. In some examples, aspects of the operations of 1405 may be performed by a transmission manager as described with reference to FIGS. 9 through 12.

At 1410, the base station may receive, based on transmitting the control signaling, an indication of a selected combination of a modulation and coding scheme and a resource block allocation. The operations of 1410 may be performed according to the methods described herein. In some examples, aspects of the operations of 1410 may be performed by a reception manager as described with reference to FIGS. 9 through 12.

At 1415, the base station may receive, over a physical channel, data in a communication generated using the selected combination of the modulation and coding scheme and the resource block allocation. The operations of 1415 may be performed according to the methods described herein. In some examples, aspects of the operations of 1415 may be performed by a data manager as described with reference to FIGS. 9 through 12.

In some examples, the blacklist(s)/tables described herein (which may include decoding statuses for various combinations of MCS and allocation size) may be added to a technical specification that governs wireless communications (e.g., based on the understanding that even though decoding performance may be decoder dependent, the blacklists may be encoder dependent, and therefore may be common to the wireless devices governed by the technical specification). In some examples, there may be two or more kinds of blacklists/tables, such as non-self-decodable blacklists/tables and pseudo-non-self-decodable blacklists/tables (where pseudo-non-self-decodable may refer codes that are self-decodable with poor performance, error floor, or not stable when considering impairments). As noted, the blacklists/tables may be different as a function of what a UE assumes about the transmission. For example, given a single transmission, the UE may assume the transmission is receive and consider only RV0. As another example, given one or more retransmissions, the UE may assume only one transmission is received and may consider all transmitted RVs. As another example, given one or more retransmissions, the UE may assume all transmissions are received and may consider the combined RVs.

The following provides an overview of aspects of the present disclosure:

Aspect 1: A method for wireless communication, comprising: identifying, for a physical channel, a plurality of combinations of modulation and coding schemes and resource block allocations that are associated with non-self-decodable codes; selecting a combination of a modulation and coding scheme and a resource block allocation based at least in part on the plurality of combinations of modulation and coding schemes and resource block allocations that are associated with non-self-decodable codes; and transmitting data over the physical channel in a communication generated using the selected combination of the modulation and coding scheme and the resource block allocation.

Aspect 2: The method of aspect 1, wherein the identifying further comprises: receiving control signaling that indicates that the plurality of combinations of modulation and coding schemes and resource block allocations are associated with non-self-decodable codes.

Aspect 3: The method of any of aspects 1 through 2, further comprising: receiving control signaling that indicates a first table of a plurality of tables, wherein the first table includes the plurality of combinations of modulation and coding schemes and resource block allocations.

Aspect 4: The method of aspect 3, wherein the plurality of combinations of modulation and coding schemes and resource block allocations in the first table is determined based at least in part on the physical channel, a number of redundancy versions, a predicted number of transmissions to be received by a wireless device, or a combination thereof.

Aspect 5: The method of any of aspects 3 through 4, further comprising: receiving control signaling that indicates the plurality of tables comprising the first table, wherein each table is associated with a respective transmission configuration of a plurality of transmission configurations.

Aspect 6: The method of aspect 5, further comprising: receiving control signaling to indicate to apply a first transmission configuration of the plurality of transmission configurations, wherein the plurality of combinations of modulation and coding schemes and resource block allocations are identified based at least in part on the first transmission configuration.

Aspect 7: The method of any of aspects 1 through 6, further comprising: transmitting, to a wireless device, an indication of the selected combination.

Aspect 8: The method of any of aspects 1 through 7, further comprising: receiving a transmission configuration that indicates one or more redundancy versions or a number of transmissions of the data, wherein the plurality of combinations is identified based at least in part on the one or more redundancy versions or the number of transmissions.

Aspect 9: The method of any of aspects 1 through 8, further comprising: receiving a transmission configuration that indicates to transmit the data a single time, wherein the plurality of combinations is identified based at least in part on the transmission configuration.

Aspect 10: The method of any of aspects 1 through 9, further comprising: receiving a transmission configuration that indicates to transmit the data multiple times, wherein the plurality of combinations is identified based at least in part on the transmission configuration.

Aspect 11: The method of aspect 10, wherein the identifying further comprises: identifying the plurality of combinations based at least in part on a predicted number of transmissions of the data to be received by a wireless device.

Aspect 12: The method of any of aspects 10 through 11, wherein the combination of the modulation and coding scheme and the resource block allocation is used for a second transmission of the data, the method further comprising: determining that a single transmission of the data will be received by a wireless device, wherein the plurality of combinations is identified based at least in part on determining that the single transmission of the data will be received at the wireless device.

Aspect 13: The method of any of aspects 10 through 12, wherein the combination of the modulation and coding scheme and the resource block allocation is used for a second transmission of the data, the method further comprising: determining that both the transmission of the data and the second transmission of the data will be received by a wireless device, wherein the plurality of combinations is identified based at least in part on determining that both the transmission of the data and the second transmission of the data will be received by the wireless device.

Aspect 14: The method of any of aspects 1 through 13, further comprising: determining an initial combination of an initial modulation and coding scheme and an initial resource block allocation for the transmission of the data; and selecting the combination of the modulation and coding scheme and the resource block allocation based at least in part on the initial combination of the initial modulation and coding scheme and the initial resource block allocation being associated with a non-self-decodable code.

Aspect 15: The method of aspect 14, wherein the combination of the modulation and coding scheme and the resource block allocation comprises a modulation and coding scheme that is different than the initial modulation and coding scheme, a resource block allocation that is different than the initial resource block allocation, or a combination thereof.

Aspect 16: The method of any of aspects 14 through 15, further comprising: determining a quantity of bits of the data, a busy ratio for the physical channel, a quality of the physical channel, or a combination thereof, wherein the initial combination is determined based at least in part on the quantity of bits of the data, the busy ratio for the physical channel, the quality of the physical channel, or a combination thereof.

Aspect 17: The method of any of aspects 1 through 16, further comprising: identifying a second plurality of combinations of modulation and coding schemes and resource block allocations that are associated with self-decodable codes or pseudo-non-self-decodable codes, wherein the combination of the modulation and coding scheme and the resource block allocation is selected based at least in part on the second plurality of combinations.

Aspect 18: The method of any of aspects 1 through 17, further comprising: encoding the data using a turbo code that is based at least in part on the combination of the modulation and coding scheme and the resource block allocation; and puncturing the encoded data, wherein transmitting the data comprises transmitting the punctured encoded data.

Aspect 19: The method of any of aspects 1 through 18, wherein transmitting the data comprises performing a cellular vehicle-to-everything (CV2X) transmission.

Aspect 20: The method of any of aspects 1 through 19, wherein the physical channel is a physical sidelink shared channel (PSSCH).

Aspect 21: A method for wireless communication, comprising: transmitting control signaling that indicates a plurality of combinations of modulation and coding scheme and resource block allocations that are associated with non-self-decodable codes; receiving, based at least in part on transmitting the control signaling, an indication of a selected combination of a modulation and coding scheme and a resource block allocation; and receiving, over a physical channel, data in a communication generated using the selected combination of the modulation and coding scheme and the resource block allocation.

Aspect 22: The method of aspect 21, further comprising: transmitting control signaling that indicates that the plurality of combinations of modulation and coding schemes and resource block allocations are associated with non-self-decodable codes.

Aspect 23: The method of any of aspects 21 through 22, further comprising: transmitting control signaling that indicates a first table of a plurality of tables, wherein the first table includes the plurality of combinations of modulation and coding schemes and resource block allocations.

Aspect 24: The method of aspect 23, wherein the plurality of combinations of modulation and coding schemes and resource block allocations in the first table is determined based at least in part on the physical channel, a number of redundancy versions, a predicted number of transmissions to be received by a wireless device, or a combination thereof.

Aspect 25: The method of any of aspects 23 through 24, further comprising: transmitting control signaling that indicates a plurality of tables comprising the first table, wherein each table is associated with a respective transmission configuration of a plurality of transmission configurations.

Aspect 26: The method of aspect 25, further comprising: transmitting control signaling to indicate to apply a first transmission configuration of the plurality of transmission configurations, wherein the plurality of combinations of modulation and coding schemes and resource block allocations are identified based at least in part on the first transmission configuration.

Aspect 27: The method of any of aspects 21 through 26, further comprising: transmitting a transmission configuration that indicates one or more redundancy versions or a number of transmissions of the data, wherein the plurality of combinations is identified based at least in part on the one or more redundancy versions or the number of transmissions.

Aspect 28: The method of any of aspects 21 through 27, further comprising: transmitting a transmission configuration that indicates to transmit the data a single time, wherein the plurality of combinations is identified based at least in part on the transmission configuration.

Aspect 29: The method of any of aspects 21 through 28, further comprising: transmitting a transmission configuration that indicates to transmit the data multiple times, wherein the plurality of combinations is identified based at least in part on the transmission configuration.

Aspect 30: The method of any of aspects 21 through 29, wherein the control signaling indicates a second plurality of combinations of modulation and coding schemes and resource block allocations that are associated with self-decodable codes, a third plurality of combinations of modulation and coding schemes and resource block allocations that are associated with pseudo-non-self-decodable codes, or a combination thereof.

Aspect 31: The method of any of aspects 21 through 30, wherein receiving the data comprises receiving the data in a cellular vehicle-to-everything (CV2X) transmission.

Aspect 32: The method of any of aspects 21 through 31, wherein the physical channel is a physical sidelink shared channel (PSSCH).

Aspect 33: An apparatus for wireless communication, comprising a processor; memory coupled with the processor; and instructions stored in the memory and executable by the processor to cause the apparatus to perform a method of any of aspects 1 through 20.

Aspect 34: An apparatus for wireless communication, comprising at least one means for performing a method of any of aspects 1 through 20.

Aspect 35: A non-transitory computer-readable medium storing code for wireless communication, the code comprising instructions executable by a processor to perform a method of any of aspects 1 through 20.

Aspect 36: An apparatus for wireless communication, comprising a processor; memory coupled with the processor; and instructions stored in the memory and executable by the processor to cause the apparatus to perform a method of any of aspects 21 through 32.

Aspect 37: An apparatus for wireless communication, comprising at least one means for performing a method of any of aspects 21 through 32.

Aspect 38: A non-transitory computer-readable medium storing code for wireless communication, the code comprising instructions executable by a processor to perform a method of any of aspects 21 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying, for a physical channel, a plurality of combinations of modulation and coding schemes and resource block allocations that are associated with non-self-decodable codes, the plurality of combinations based at least in part on a quantity of times data is to be transmitted and a predicted quantity of times the data will be received by a wireless device;
   selecting a combination of a modulation and coding scheme and a resource block allocation based at least in part on the plurality of combinations of modulation and coding schemes and resource block allocations that are associated with non-self-decodable codes; and
   transmitting the data over the physical channel in a communication generated using the selected combination of the modulation and coding scheme and the resource block allocation.

2. The method of claim 1, wherein the identifying further comprises:
   receiving control signaling that indicates that the plurality of combinations of modulation and coding schemes and resource block allocations are associated with non-self-decodable codes.

3. The method of claim 1, further comprising:
   receiving control signaling that indicates a first table of a plurality of tables, wherein the first table includes the plurality of combinations of modulation and coding schemes and resource block allocations.

4. The method of claim 3, wherein the plurality of combinations of modulation and coding schemes and resource block allocations in the first table is determined based at least in part on the physical channel, a number of redundancy versions, or a combination thereof.

5. The method of claim 3, further comprising:
receiving control signaling that indicates the plurality of tables comprising the first table, wherein each table is associated with a respective transmission configuration of a plurality of transmission configurations.

6. The method of claim 5, further comprising:
receiving control signaling to indicate to apply a first transmission configuration of the plurality of transmission configurations, wherein the plurality of combinations of modulation and coding schemes and resource block allocations are identified based at least in part on the first transmission configuration.

7. The method of claim 1, further comprising:
transmitting, to a wireless device, an indication of the selected combination.

8. The method of claim 1, further comprising:
receiving a transmission configuration that indicates one or more redundancy versions or a number of transmissions of the data, wherein the plurality of combinations is identified based at least in part on the one or more redundancy versions or the number of transmissions.

9. The method of claim 1, further comprising:
receiving a transmission configuration that indicates to transmit the data a single time, wherein the plurality of combinations is identified based at least in part on the transmission configuration.

10. The method of claim 1, further comprising:
receiving a transmission configuration that indicates the quantity of times the data is to be transmitted, wherein the plurality of combinations is identified based at least in part on the transmission configuration, and wherein transmitting the data comprises a first transmission of the data.

11. The method of claim 10, wherein the combination of the modulation and coding scheme and the resource block allocation is used for a second transmission of the data, the method further comprising:
determining that a single transmission of the data will be received by a wireless device, wherein the plurality of combinations is identified based at least in part on determining that the single transmission of the data will be received at the wireless device.

12. The method of claim 10, wherein the combination of the modulation and coding scheme and the resource block allocation is used for a second transmission of the data, the method further comprising:
determining that both the first transmission of the data and the second transmission of the data will be received by a wireless device, wherein the plurality of combinations is identified based at least in part on determining that both the first transmission of the data and the second transmission of the data will be received by the wireless device.

13. The method of claim 1, further comprising:
determining an initial combination of an initial modulation and coding scheme and an initial resource block allocation for transmitting the data; and
selecting the combination of the modulation and coding scheme and the resource block allocation based at least in part on the initial combination of the initial modulation and coding scheme and the initial resource block allocation being associated with a non-self-decodable code.

14. The method of claim 13, wherein the combination of the modulation and coding scheme and the resource block allocation comprises a modulation and coding scheme that is different than the initial modulation and coding scheme, a resource block allocation that is different than the initial resource block allocation, or a combination thereof.

15. The method of claim 13, further comprising:
determining a quantity of bits of the data, a busy ratio for the physical channel, a quality of the physical channel, or a combination thereof, wherein the initial combination is determined based at least in part on the quantity of bits of the data, the busy ratio for the physical channel, the quality of the physical channel, or a combination thereof.

16. The method of claim 1, further comprising:
identifying a second plurality of combinations of modulation and coding schemes and resource block allocations that are associated with self-decodable codes or pseudo-non-self-decodable codes, wherein the combination of the modulation and coding scheme and the resource block allocation is selected based at least in part on the second plurality of combinations.

17. The method of claim 1, further comprising:
encoding the data using a turbo code that is based at least in part on the combination of the modulation and coding scheme and the resource block allocation; and
puncturing the encoded data, wherein transmitting the data comprises transmitting the punctured encoded data.

18. The method of claim 1, wherein transmitting the data comprises performing a cellular vehicle-to-everything (CV2X) transmission.

19. The method of claim 1, wherein the physical channel is a physical sidelink shared channel (PSSCH).

20. An apparatus for wireless communication, comprising:
a processor,
memory coupled with the processor; and
instructions stored in the memory and executable by the processor to cause the apparatus to:
identify, for a physical channel, a plurality of combinations of modulation and coding schemes and resource block allocations that are associated with non-self-decodable codes, the plurality of combinations based at least in part on a quantity of times data is to be transmitted and a predicted quantity of times the data will be received by a wireless device;
select a combination of a modulation and coding scheme and a resource block allocation based at least in part on the plurality of combinations of modulation and coding schemes and resource block allocations that are associated with non-self-decodable codes; and
transmit the data over the physical channel in a communication generated using the selected combination of the modulation and coding scheme and the resource block allocation.

21. The apparatus of claim 20, further comprising a transceiver, wherein the instructions executable by the processor to cause the apparatus to identify the plurality of combinations further comprise instructions executable by the processor to cause the apparatus to:
receive, via the transceiver, control signaling that indicates that the plurality of combinations of modulation and coding schemes and resource block allocations are associated with non-self-decodable codes.

22. The apparatus of claim 20, further comprising a transceiver, wherein the instructions are further executable by the processor to cause the apparatus to:
receive, via the transceiver, control signaling that indicates a first table of a plurality of tables, wherein the first table includes the plurality of combinations of modulation and coding schemes and resource block allocations.

23. The apparatus of claim 22, wherein the plurality of combinations of modulation and coding schemes and resource block allocations in the first table is determined based at least in part on the physical channel, a number of redundancy versions, or a combination thereof.

24. The apparatus of claim 22, wherein the instructions are further executable by the processor to cause the apparatus to:
receive, via the transceiver, control signaling that indicates the plurality of tables comprising the first table, wherein each table is associated with a respective transmission configuration of a plurality of transmission configurations.

25. The apparatus of claim 24, wherein the instructions are further executable by the processor to cause the apparatus to:
receive, via the transceiver, control signaling to indicate to apply a first transmission configuration of the plurality of transmission configurations, wherein the plurality of combinations of modulation and coding schemes and resource block allocations are identified based at least in part on the first transmission configuration.

26. The apparatus of claim 20, further comprising a transceiver, wherein the instructions are further executable by the processor to cause the apparatus to:
transmit, via the transceiver to a wireless device, an indication of the selected combination.

27. The apparatus of claim 20, further comprising a transceiver, wherein the instructions are further executable by the processor to cause the apparatus to:
receive, via the transceiver, a transmission configuration that indicates one or more redundancy versions or a number of transmissions of the data, wherein the plurality of combinations is identified based at least in part on the one or more redundancy versions or the number of transmissions.

28. An apparatus for wireless communication, comprising:
means for identifying, for a physical channel, a plurality of combinations of modulation and coding schemes and resource block allocations that are associated with non-self-decodable codes, the plurality of combinations based at least in part on a quantity of times data is to be transmitted and a predicted quantity of times the data will be received by a wireless device;
means for selecting a combination of a modulation and coding scheme and a resource block allocation based at least in part on the plurality of combinations of modulation and coding schemes and resource block allocations that are associated with non-self-decodable codes; and
means for transmitting the data over the physical channel in a communication generated using the selected combination of the modulation and coding scheme and the resource block allocation.

29. A non-transitory computer-readable medium storing code for wireless communication, the code comprising instructions executable by a processor to:
identify, for a physical channel, a plurality of combinations of modulation and coding schemes and resource block allocations that are associated with non-self-decodable codes, the plurality of combinations based at least in part on a quantity of times data is to be transmitted and a predicted quantity of times the data will be received by a wireless device;
select a combination of a modulation and coding scheme and a resource block allocation based at least in part on the plurality of combinations of modulation and coding schemes and resource block allocations that are associated with non-self-decodable codes; and
transmit the data over the physical channel in a communication generated using the selected combination of the modulation and coding scheme and the resource block allocation.

* * * * *